United States Patent
Jung et al.

(10) Patent No.: US 11,054,143 B2
(45) Date of Patent: Jul. 6, 2021

(54) COOKING APPLIANCE

(71) Applicant: LG Electronics Inc., Seoul (KR)

(72) Inventors: Euisu Jung, Seoul (KR); Hwichang Son, Seoul (KR); Moonho Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 282 days.

(21) Appl. No.: 16/180,484

(22) Filed: Nov. 5, 2018

(65) Prior Publication Data

US 2019/0072281 A1 Mar. 7, 2019

Related U.S. Application Data

(62) Division of application No. 14/867,887, filed on Sep. 28, 2015, now Pat. No. 10,443,857.

(30) Foreign Application Priority Data

Sep. 26, 2014 (KR) .................. 10-2014-0129598

(51) Int. Cl.
*F24C 15/02* (2006.01)
*A21B 3/02* (2006.01)

(52) U.S. Cl.
CPC .............. *F24C 15/024* (2013.01); *A21B 3/02* (2013.01)

(58) Field of Classification Search
CPC ........ F24C 15/16; F24C 15/168; F24C 15/02; F24C 15/024; A47B 88/46; A47B 88/467; A47B 88/473

(Continued)

(56) References Cited

U.S. PATENT DOCUMENTS

| 1,801,190 | A |   | 4/1931 | William |
|---|---|---|---|---|
| 2,130,168 | A | * | 9/1938 | Weiskittel ............... F24C 15/16 126/339 |

(Continued)

FOREIGN PATENT DOCUMENTS

| DE | 102004059563 | 2/2006 |
|---|---|---|
| DE | 102012203519 | 9/2013 |

(Continued)

OTHER PUBLICATIONS

United States Notice of Allowance in U.S. Appl. No. 14/867,887, dated Jun. 3, 2019, 7 pages.

(Continued)

*Primary Examiner* — James O Hansen
(74) *Attorney, Agent, or Firm* — Fish & Richardson P.C.

(57) ABSTRACT

In one aspect, a cooking appliance includes a cabinet forming a cavity configured to provide a food accommodation space; at least one door covering the cavity; a handle rotatably coupled to the door; and a handle supporter disposed inside the door and configured to rotatably support the handle relative to the door. In another aspect, a cooking appliance includes a drawer configured to be withdrawn from or inserted into the cooking appliance; a first rail disposed on the drawer; a second rail disposed on a frame of the cooking appliance and configured to accommodate a sliding motion of the first rail; a link component disposed at the first rail; a sliding control assembly disposed at the second rail and configured to accommodate the link component to automatically insert the drawer into the frame and to mitigate an impact of the drawer being fully inserted into the frame.

20 Claims, 22 Drawing Sheets

(58) Field of Classification Search
USPC .......................... 312/410, 330.1, 333, 319.1
See application file for complete search history.

(56) References Cited

U.S. PATENT DOCUMENTS

| | | | | |
|---|---|---|---|---|
| 2,586,138 | A | * | 2/1952 | Zaltzman .............. F24C 15/168 312/410 |
| 2,762,677 | A | * | 9/1956 | Reeves .................. F24C 15/18 312/410 |
| 4,082,077 | A | | 4/1978 | Marfatia et al. |
| 7,445,005 | B2 | | 11/2008 | Bartmann et al. |
| 9,138,056 | B2 | | 9/2015 | Kwon et al. |
| 9,777,523 | B2 | | 10/2017 | Choi et al. |
| 2006/0238089 | A1 | * | 10/2006 | Prentner ................... E05F 1/16 312/333 |
| 2008/0276925 | A1 | | 11/2008 | Griswold et al. |
| 2008/0309211 | A1 | * | 12/2008 | Wilson .................... F24C 15/02 312/410 |
| 2009/0165258 | A1 | | 7/2009 | Laundroche et al. |
| 2012/0272832 | A1 | * | 11/2012 | Kwon ..................... F24C 15/16 99/324 |
| 2014/0035453 | A1 | | 2/2014 | Kwon et al. |
| 2016/0076289 | A1 | | 3/2016 | Choi et al. |
| 2018/0283698 | A1 | | 10/2018 | Lee |

FOREIGN PATENT DOCUMENTS

| | | |
|---|---|---|
| EP | 2093492 | 8/2009 |
| EP | 2359735 | 8/2011 |
| KR | 10-2001-0026279 | 4/2001 |
| KR | 10-2004-0061317 | 7/2004 |
| KR | 10-2006-0082263 | 7/2006 |
| KR | 20-2009-0002091 | 3/2009 |
| KR | 10-2014-0018565 | 2/2014 |
| WO | WO03072899 | 9/2003 |

OTHER PUBLICATIONS

United States Office Action in U.S. Appl. No. 14/867,887, dated Feb. 7, 2019, 17 pages.

* cited by examiner

COOKING APPLIANCE

CROSS-REFERENCE TO RELATED APPLICATIONS

This application is a divisional of U.S. application Ser. No. 14/867,887, filed on Sep. 28, 2015, which claims priority to Korean Application No. 10-2014-0129598, filed on Sep. 26, 2014. The disclosures of the prior applications are incorporated by reference in their entirety.

BACKGROUND

1. Field

The present disclosure relates to a cooking appliance.

2. Background

A cooking appliance is a type of kitchen appliance that heats food using heat emitted from a heating source. Cooking appliances are typically classified in accordance with the types of heat sources that are used for heating food.

For example, cooking appliances are often classified into electric cooking appliances that cook food by heat emitted from a heat source having electrical energy being supplied to the heat source, and gas cooking appliances that cook food by heat radiated from a heat source having gas being supplied to the heat source.

In addition, in accordance with the types of heating sources, electric cooking appliances are typically classified into ovens that cook food by a heater emitting radiant heat, and microwave ovens that cook food using microwaves of a predetermined wavelength.

A typical microwave oven includes a cooking compartment for cooking food, which may be configured to be opened or closed by a door. A microwave oven also includes a magnetron mounted on one side of the cooking compartment for supplying microwaves to the cooking compartment via a power source.

Furthermore, a turntable for supporting food is typically provided in an inner space of the cooking compartment, and the turntable rotates while supporting the food to enable the food to be uniformly heated.

SUMMARY

According to one aspect, a cooking appliance may include a cabinet forming a cavity configured to provide a food accommodation space; at least one door covering the cavity; a handle rotatably coupled to the door; and a handle supporter disposed inside the door and configured to rotatably support the handle relative to the door.

Implementations of this aspect may include one or more of the following features. In some implementations, the cabinet may form a first cavity and a second cavity, wherein the second cavity may be disposed below the first cavity.

In some implementations, the at least one door may include a first door covering the first cavity; and a second door covering the second cavity.

In some implementations, the handle supporter may include a handle lever coupled to the handle; and a handle supporter casing configured to rotatably support the handle lever.

In some implementations, the handle lever may include a handle coupling component coupled to the handle; and a handle rotary component connected to the handle coupling component to be rotatably coupled to the handle supporter casing.

In some implementations, the handle supporter casing may include a handle connection component to which a first portion of the handle lever is rotatably coupled; and a handle rotation support component configured to support the handle connection component.

In some implementations, the handle rotary component may be partially fitted and coupled to the handle connection component, such that the handle rotary component is rotatably mounted with respect to the handle connection component.

In some implementations, the handle supporter casing may include a first supporter casing coupled to the first portion of the handle lever; and a second supporter casing coupled to a second portion of the handle lever, wherein the first supporter casing and the second supporter casing may be configured to be detachable from each other.

In some implementations, the cooking appliance may further include a casing coupling unit configured to be coupled between the first supporter casing and the second supporter casing.

In some implementations, a handle supporter guide that is configured to guide a coupling position may be formed at one of the first supporter casing and the second supporter casing; and a handle supporter guide accommodation groove that is configured to accommodate the handle supporter guide may be formed at the other one of the first supporter casing and the second supporter casing.

According to another aspect, a cooking appliance includes an oven unit. The oven unit may include a cooking compartment forming an interior space configured to cook food, a heating source configured to heat the interior space of the cooking compartment, and a first door configured to open or close the cooking compartment. A drawer unit may be disposed at one side of the oven unit and may include a drawer configured to accommodate food. A second door may be configured to form a front exterior of the drawer. A control unit may be configured to control the oven unit and the drawer unit. At least one of the first door or the second door may include a handle rotatably mounted relative to the at least one of the first door or the second door; and a handle supporter configured to rotatably support the handle.

In some implementations, a coupling hole may be formed at one surface of the at least one of the first door or the second door on which the handle is mounted, the coupling hole may be configured such that a portion of the supporter coupled to the handle is insertable therethrough.

In some implementations, the handle supporter may include a handle lever coupled to the handle; a handle supporter casing configured to rotatably support the handle lever; and a handle fastening member configured to connect the handle lever to the handle supporter casing.

In some implementations, the handle lever may include a handle coupling component coupled to the handle; and a handle rotary component that extends from the handle coupling component and that is rotatably supported by the handle supporter casing as the handle fastening member couples the handle supporter casing to the handle lever.

In some implementations, the handle supporter casing may include a handle connection component configured to connect, by the handle fastening member, to a portion of the handle lever as the portion of the handle lever is inserted into the handle connection component; and a handle rotation support component that extends from the handle connection component, is configured to support the handle connection component, and is fixedly coupled to the handle.

In some implementations, the handle fastening member may include a pin.

In some implementations, the handle, the handle lever, and the handle supporter casing may be fastened to each other by the handle fastening member.

According to another aspect, a cooking appliance may include a drawer configured to be withdrawn from or inserted into the cooking appliance. A first rail may be disposed on the drawer. A second rail may be disposed on a frame of the cooking appliance and configured to accommodate a sliding motion of the first rail. A link component may be disposed at the first rail on the drawer. A sliding control assembly may be disposed at an upper portion of the second rail on the frame and configured to accommodate the link component. The sliding control assembly and the link component may be configured to automatically insert the drawer into the frame; and also mitigate an impact of the drawer being fully inserted into the frame.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

In some implementations, a microwave oven provides various ways and conditions of heating in order to facilitate cooking of various dishes, such as a cooking appliance with both a magnetron and a heater mounted. In this case, food is heated by the heater for dishes that require rapid cooking, and food is heated by the magnetron for dishes that do not require relatively rapidly cooking.

In addition, as various types of food are cooked, the cooking appliance may be configured to cook food of different volume or weight. As an example, an oven may include a cooktop unit configured to heat and cook food in an open space using a plurality of burners or heaters, an oven unit configured to heat and cook food in a closed space using a burner or a heater, and a drawer unit for keeping the food warm.

In implementations in which the drawer unit of the oven configured as above is disposed at a lower end portion of the oven, a user may be required to bend at his or her waist when attempting to insert or withdraw food or a food container into or from the drawer unit.

In some implementation, a drawer unit of an electric oven range may include a drawer opening/closing device mounted on one side of the drawer unit to enable a drawer to be selectively withdrawn or inserted by a simple user action, such as a repetitive force in the same direction, thereby improving convenience in use.

To address the problem in which a user needs to bend at his or her waist to use the drawer unit, the drawer may be configured to be selectively withdrawn or inserted by a simple user action, such as a repetitive force in the same direction.

Further, in some implementations, in addition to providing the convenience of selective withdrawal and insertion of the drawer described above, an oven may be configured to provide such functionality in a less complex manner.

Figure 1:
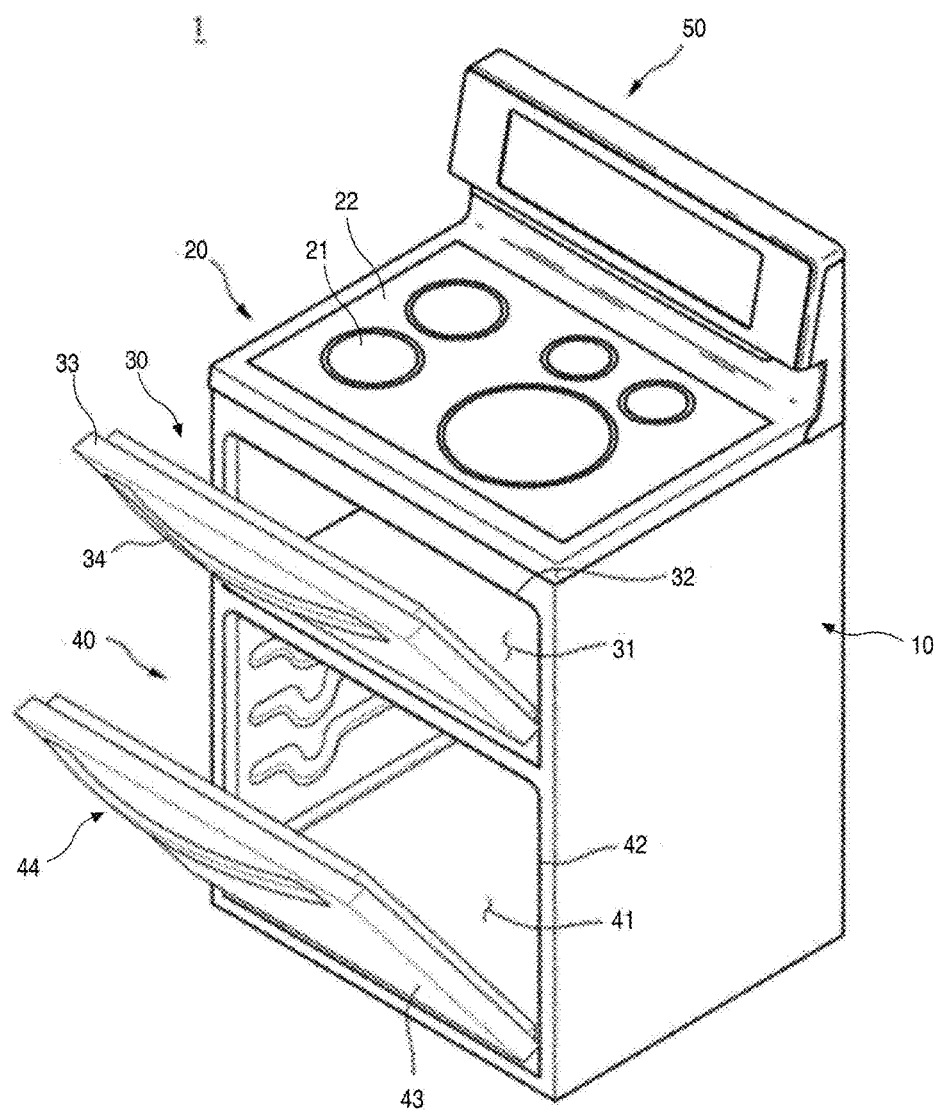
FIG. 1 is a perspective view illustrating a configuration of a cooking appliance according to an implementation of the present disclosure.

FIG. 1 is a perspective view illustrating a configuration of a cooking appliance according to an implementation of the present disclosure.

Referring to FIG. 1, a cooking appliance 1 according to an implementation of the present disclosure may include an outer case 10, a cooktop unit 20, a first cooking unit 30, a second cooking unit 40, and a control unit 50.

The outer case 10 may form exteriors of both side surfaces and a rear surface of the first and second cooking units 30 and 40.

The first cooking unit 30 may be disposed at a central portion of the cooking appliance 1, the cooktop unit 20 may be disposed at above the first cooking unit 30, the second cooking unit 40 may be disposed below the first cooking unit 30, and the control unit 50 may be disposed at a rear portion of the cooktop unit 20.

The first cooking unit 30 includes a first cavity 32 having one open surface, a first cooking compartment 31 formed at the first cavity 32 to accommodate food, a first door 33 forming a front exterior while the cavity 32 is covered, and a first handle 34 formed at the first door 33 to be gripped by a user.

The second cooking unit 40 includes a second cavity 42 having one open surface, a second cooking compartment 41 formed at the second cavity 42 to accommodate food, a second door 43 forming a front exterior while the second cavity 42 is covered, and a second handle 44 formed at the second door 43 to be gripped by the user.

The first and second cavities 32 and 42 are formed in a cuboid shape in which a front surface is opened, but the shape is not limited thereto.

At the first and second cooking units 30 and 40, a plurality of heaters for cooking the food accommodated in the first and second cooking compartments 31 and 41 may be mounted. The plurality of heaters simultaneously or selectively operate to emit heat for cooking the food. In other words, the food can be cooked by radiant heat and conductive heat emitted from the plurality of heaters.

Meanwhile, the cooking appliance 1 may be formed of the first cooking unit 30 and the control unit 50, or of the second cooking unit 40 and the control unit 50.

A plurality of cooktop heaters 21 or cooktop burners may be mounted on the cooktop unit 20 depending on the types thereof. The cooktop heaters 21 are configured to emit heat by a power source being supplied, and the cooktop burners are configured to emit heat from flames generated by burning gas being supplied.

In an implementation of the present disclosure, a configuration in which the plurality of cooktop heaters 21 is mounted will be examined as an example. The cooktop unit 20 as a whole is formed of a cuboid plate that has an inner space while having a predetermined thickness. The cooktop unit 20 includes a cooktop case having a predetermined inner space, and an upper glass surface 22 configured to cover an open upper surface of the cooktop case.

An operation unit for operating the cooktop unit 20 may be further provided at a front surface of the cooktop case. The operation unit may also be provided at the control unit 50.

In addition, one or more heaters may be mounted on the cooktop unit 20. However, the one or more heaters may not be exposed to the outside of the cooktop unit 20. Thus, there are no limitations in types of heating sources that constitute the cooktop unit 20 in the present implementation.

According to an implementation of the present disclosure, the plurality of cooktop heaters 21 are accommodated in the inner space of the cooktop case to emit heat by a power source being supplied, thereby heating food or a food container placed on top of the plurality of cooktop heaters 21.

The plurality of cooktop heaters 21 generating various power outputs and having a cross-sectional area of various sizes are installed at the cooktop unit 20, and a user can cook food by selecting an appropriate heater among the plurality of cooktop heaters 21 in accordance with the amount of food or the volume of a food container.

The plurality of cooktop heaters 21 is installed to come in close contact with a lower surface of the upper glass surface 22 so that heat emitted from the plurality of cooktop heaters 21 is conducted well to the upper glass surface 22. At a lower side of the plurality of cooktop heaters 21, a supporter or supporting member for supporting the plurality of cooktop heaters 21 to come in close contact with the lower surface of the upper glass surface 22 is further provided.

The upper glass surface 22 is formed of a ceramic material having a predetermined thickness and excellent thermal resistance, thereby securing a safety of a user while supporting the food or food container placed on an upper surface thereof.

As the upper surface of the upper glass surface 22 is formed as one flat surface, the upper glass surface 22 may be mounted such that the plurality of cooktop heaters 21 is not exposed to the outside of the cooktop unit 20, thereby enabling a user to easily clean the cooktop unit 20 and improving convenience in use.

The first cooking unit 30 is disposed below the cooktop unit 20, and the second cooking unit 40 is disposed below the first cooking unit 30.

Hereinafter, a configuration of the second cooking unit 40 will be described as an example. Since a configuration of the first cooking unit 30 is the same or similar with that of the second cooking unit 40, a description of the first cooking unit 30 will be omitted.

The second cooking unit 40 may include an upper heater disposed at an upper side of the second cavity 42, a lower heater disposed at a lower side of the second cavity 42, and a convection heater disposed at a rear side of the second cavity 42.

As an example, the upper heater may be installed at an upper wall of the second cavity 42, the lower heater may be installed at a lower wall of the second cavity 42, and the convection heater may be installed at a rear wall of the second cavity 42.

The convection heater suctions and heats air in the second cooking compartment 41 and discharges the air back into the second cooking compartment 41, allowing the air in the second cooking compartment 41 to flow, thereby uniformly heating and cooking food placed inside the second cooking compartment 41.

A sheath heater, a halogen heater, and the like that emit heat by a power source supplied from the outside may be used as the plurality of heaters while there are no limitations on the types of the heaters. The upper heater, the lower heater, and the convection heater may also be selectively omitted depending on a type of the cooking appliance 1.

In addition, since the plurality of heaters perform a function of heating the second cooking compartment 41, the plurality of heaters may be called a heating source or a heat source.

At the second cooking unit 40, the second door 43 for opening or closing the second cavity 42 is mounted. The second door 43 is rotatably mounted on a front surface of the second cavity 42.

As an example, the second door 43 is mounted to open or close the second cavity 42 by a pull-down method in which the upper end of the second door 43 moves vertically with respect to the lower end thereof. However, in the present implementation, there are no limitations on the method in which the second door 43 opens or closes the second cavity 42.

In other words, the second door 43 may be mounted to open or close the second cooking compartment 41 by a pull-down method in which the upper end of the second door 43 moves vertically with respect to the lower end thereof, or may be mounted to open or close the second cooking compartment 41 by a pull-up method in which the lower end moves vertically with respect to the upper end.

The second handle 44 to be gripped by a user to rotate the second door 43 may be disposed at an upper end of a front surface of the second door 43. The second handle 44 may protrude toward the front of the second door 43, or may be recessed toward the rear of the second door 43, so that the user can grip the recessed portion.

In an implementation of the present disclosure, a configuration in which the second handle 44 is provided in a shape of a rod extending horizontally while having a predetermined thickness will be described as an example.

Since the first cooking unit 30 may be installed in an identical or similar way with the second cooking unit 40, the description thereof will be omitted.

In addition, as an example of an operation signal to control an operation of the cooking appliance 1, the control unit 50 may include a plurality of buttons for inputting an operation signal for at least one operation of the first and second cooking units 30 and 40, and a display window configured to display various information on the cooking appliance 1 to the outside.

Hereinafter, a configuration of a door of a cooking appliance according to an implementation of the present disclosure will be examined with reference to FIGS. 2 to 6. Since configurations of the first door 33 and the second door 43 are identical to or similar with each other, only the second door 43 will be examined as an example in an implementation of the present disclosure.

Figure 2:
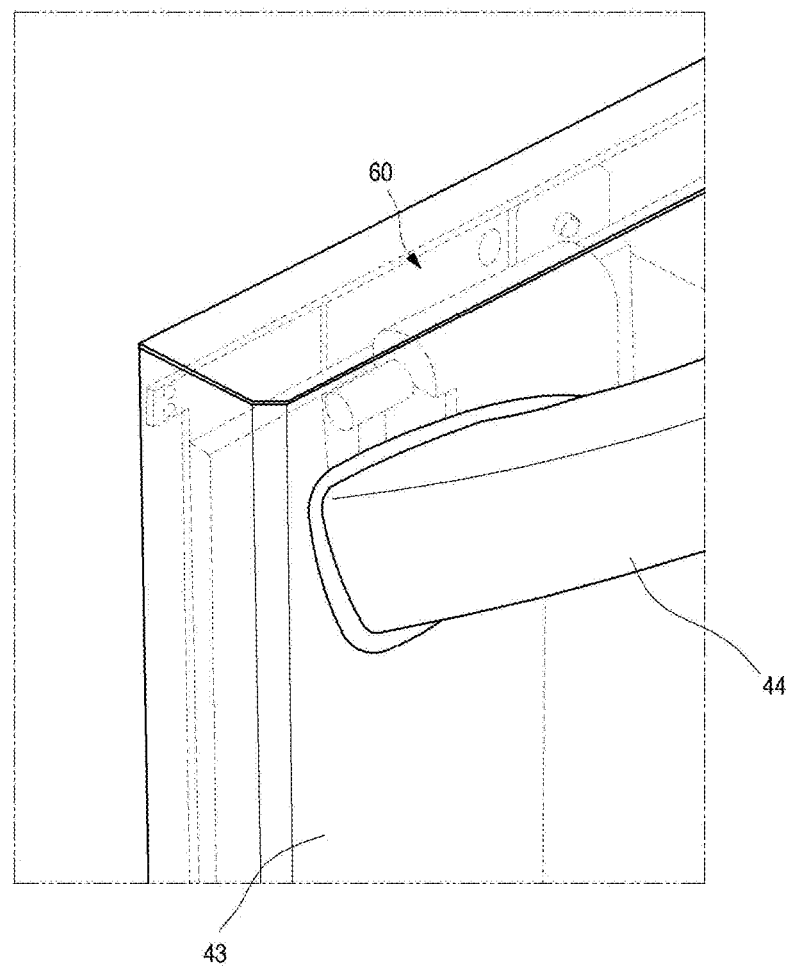
FIG. 2 is a partially projected and enlarged perspective view illustrating a portion of a door of a cooking appliance according to an implementation of the present disclosure.
Figure 3:
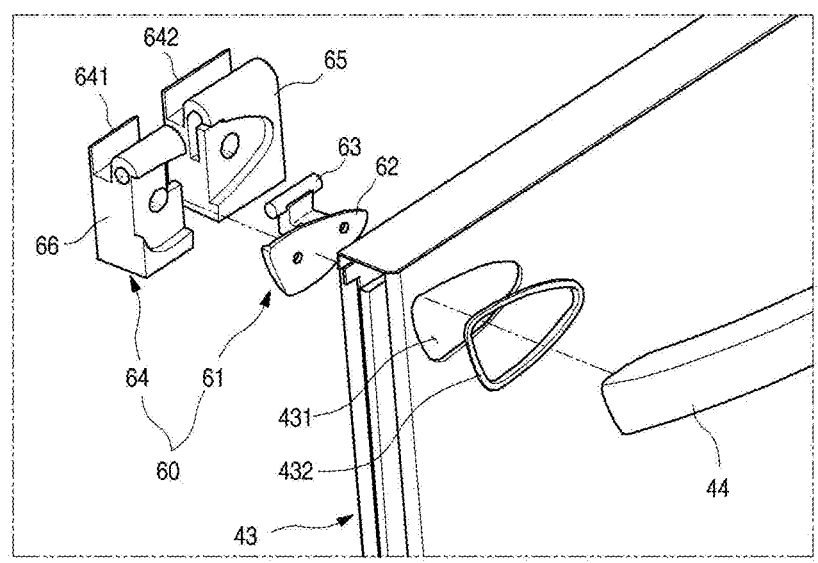
FIG. 3 is an exploded perspective view illustrating a coupling between a handle and a supporter mounted on a door of a cooking appliance according to an implementation of the present disclosure.
Figure 4:
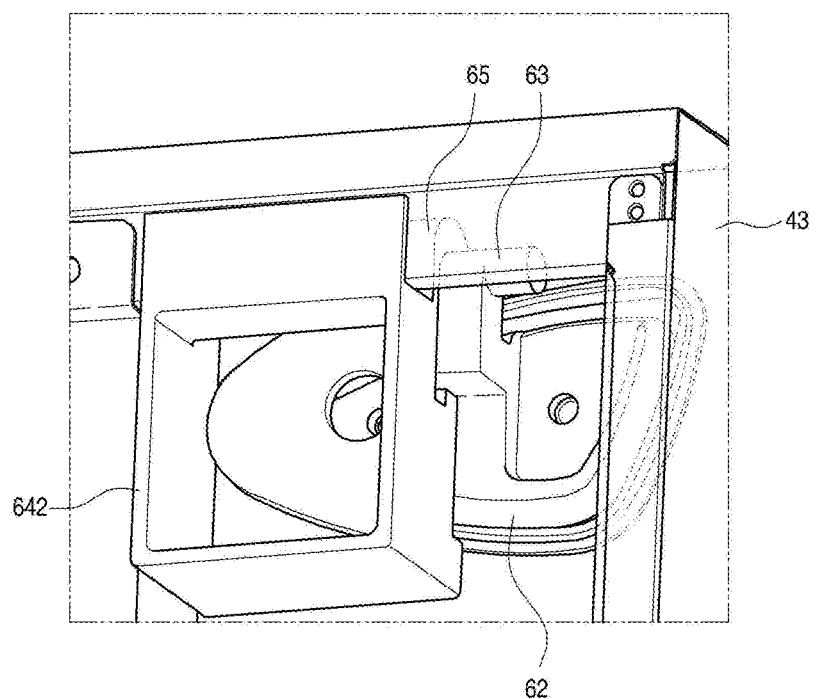
FIG. 4 is a rear perspective view illustrating a portion of a configuration of a supporter disposed inside a door of a cooking appliance according to an implementation of the present disclosure.
Figure 5:
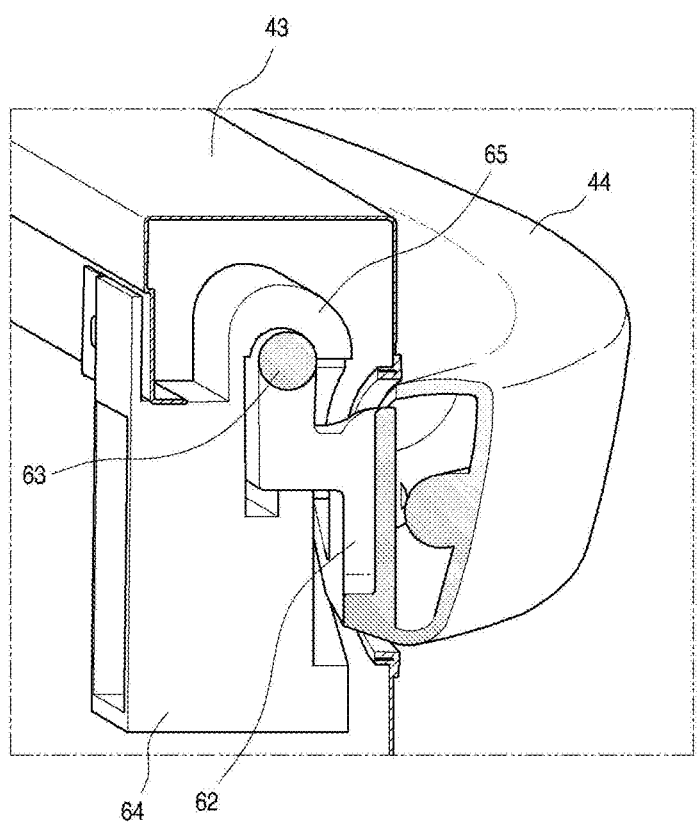
FIG. 5 is a partially cut-away perspective view illustrating inner configurations of a door and a handle of a cooking appliance according to an implementation of the present disclosure.

FIG. 2 is a partially projected and enlarged perspective view illustrating a portion of a door of the cooking appliance according to an implementation of the present disclosure; FIG. 3 is an exploded perspective view illustrating a coupling of a door, a handle, and a supporter of the cooking appliance according to an implementation of the present disclosure; FIG. 4 is a partially cut-away rear perspective view illustrating a configuration of the supporter that supports the handle coupled to the door of the cooking appliance according to an implementation of the present disclosure; and FIG. 5 is a partially cut-away side perspective view illustrating configurations of the handle coupled to the door of the cooking appliance and the supporter that supports the handle according to an implementation of the present disclosure.

Referring to FIGS. 2 to 5, the second door 43 is formed of a quadrilateral plate that has a predetermined thickness, and forms a front exterior of the second cooking unit 40 when the second cavity 42 is covered.

The second handle 44 that can be gripped by a user is mounted on a front surface of the second door 43. The second handle 44 is formed of a rod that has a predetermined thickness and width, and a central portion thereof protrudes in a direction in which the cavity 42 is opened while having a predetermined curvature.

The second handle 44 is rotatably coupled to the front surface of the second door 43, so that a user can open or close the second cavity 42 by gripping the second handle 44.

Specifically, when the user attempts to open or close the second cavity 42 by gripping the second handle 44, the second handle 44 is mounted to be upwardly rotatable with respect to the front surface of the second door 43, thereby relieving a physical burden on the user.

Consequently, convenience in using the second cooking unit 40 can be improved, and convenience in using the cooking appliance 1 as a whole can be improved.

A supporter 60 is disposed at an inner space of the second door 43, and is fixed and mounted while being coupled to the second handle 44 by a fastening member. Here, the supporter 60 supports the second handle 44 to be rotatable, so that the second handle 44 can be rotatably coupled with respect to the front surface of the second door 43.

The supporter 60 is disposed at the inner space of the second door 43 in which both end portions of the second handle 44, more specifically both end portions to which the second handle 44 is coupled and fastened, are disposed.

A coupling hole 431 cut as much as a predetermined area is formed at the second door 43, so that the both end portions of the second handle 44 can be coupled to the supporter 60.

A hole cover 432 to prevent introduction of a foreign substance that can be introduced through a space between the second door 43 and the second handle 44 is provided at an edge portion of the coupling hole 431.

The hole cover 432 is mounted on the second door 43 while being fitted and coupled to the edge portion of the coupling hole 431. If the hole cover 432 is formed of a material having predetermined elasticity and mounted at the edge portion of the coupling hole 431, a noise and wear generated as the second handle 44 comes in contact with the second door 43 when the second handle 44 rotates with respect to the second door 43 can be prevented.

The supporter 60 is disposed at the rear of the coupling hole 431, and includes a handle lever 61 coupled to the second handle 44, and a handle supporter casing 64 to which the handle lever 61 is rotatably coupled and supported.

The handle lever 61 includes a handle coupling component 62 fixed after being fastened to the second handle 44 by a fastening member, and a handle rotary component 63 connected to the handle coupling component 62 to be rotatably coupled to the handle supporter casing 64.

The handle coupling component 62 may correspond to the coupling hole 431 while having an area equal to or smaller than that of the coupling hole 431. Preferably, the handle coupling component 62 is formed in an area somewhat smaller than that of the coupling hole 431.

A reason for this is to allow the handle coupling component 62 to partially pass through the coupling hole 431 and be withdrawn to the front of the second door 43 when the second handle 44 rotates with respect to the second door 43.

In addition, a reason for the handle coupling component 62 to correspond to the coupling hole 431 is to maximally prevent an external foreign substance from flowing into an inner portion of the second door 43 through the coupling hole 431.

The handle rotary component 63 is bent upward while extending from a rear surface of the handle coupling component 62 toward the rear, and is formed in an "L" shape when viewed from the side. To be rotatably coupled to the handle supporter casing 64, an upper end portion of the handle rotary component 63 is formed of a horizontally lying cylinder i.e., a round bar.

In addition, the length, more specifically the horizontal length, of an upper end of the handle rotary component 63 is longer than the lateral length of a portion bent at a lower portion. When viewed from the front, the handle rotary component 63 is formed in a "T" shape and has left and right end portions of predetermined length protruding sideward past the upper end portion of the bent portion.

A reason for this is to enable the handle rotary component 63 to be rotatably coupled to the handle supporter casing 64 as long as the sideward protruding length of the left and right end portions of the handle rotary component 63 is more than the lateral length of the bent portion.

The handle supporter casing 64 is disposed behind the handle lever 61. The handle supporter casing 64 as a whole is formed in a cuboid shape, and includes a seating groove to have the handle coupling component 62 seated formed at a front surface thereof. At the seating groove, a fastening hole through which a fastening member penetrates to fasten the handle supporter casing 64 to the handle coupling component 62 is formed.

The handle supporter casing 64 includes a handle connection component 65 to which the handle rotary component 63 is rotatably connected, and a support unit 66 extending downward from a lower side of the handle connection component 65 to support the handle coupling component 62 and the handle connection component 65.

If the handle rotary component 63 is partially accommodated in the handle connection component 65, and the handle coupling component 62 moves toward the front of the handle supporter casing 64 by a motion of the second handle 44, the upper end portion of the handle rotary component 63 is coupled to the handle connection component 65, causing a lower end portion of the handle coupling component 62 to move forward while the upper end portion of the handle rotary component 63 is fixed, such that the upper end portion rotates while being coupled to the handle connection component 65, and the lower end portion moves along a track formed in a shape of a quadratic curve.

In other words, if the user grips the second handle 44 to move the second door 43 in a direction in which the second cavity 42 is opened while the handle rotary component 63 is coupled to the handle connection component 65, the lower end portion of the handle coupling component 62 rotates along the track formed in the shape of a quadratic curve with the upper end of the handle rotary component 63 connected to the handle connection component 65 as the center of rotation, such that the second handle 44 rotates by a predetermined angle with respect to the front surface of the second door 43.

The support unit 66 is formed in a cuboid shape having a predetermined inner space, and has the handle connection component 65 formed at an upper surface thereof. The handle connection component 65 has a central portion convexly rounded upward, and is arch-shaped when viewed from the side. A space corresponding to an exterior of the handle rotary component 63 is formed at an inner surface of the longitudinal central portion of the support unit 66 to have the handle rotary component 63 inserted thereinto.

Specifically, the handle connection component 65 is formed in a shape similar to "∩" when viewed from the side, and has the handle rotary component 63 inserted into and coupled to an inner space thereof. More specifically, as the portion at the upper end of the handle rotary component 63 protruding sideward past the bent portion is inserted into the inner space of the handle connection component 65, the handle rotary component 63 is rotatably connected to the handle connection component 65.

Here, the handle connection component 65 may be formed in a shape of a circular pipe that has an inner space instead of an arch, and the handle connection component 65 may be connected to the handle rotary component 63 as the handle rotary component 63 is inserted into the inner space.

However, the interior of the handle connection component 65 should be formed in a size and form corresponding to the exterior of the protruding portion formed at the upper end of the handle rotary component 63, and the handle lever 61 should be configured to be rotatable with the upper end of the handle rotary component 63 as the center of rotation while the upper end of the handle rotary component 63 is inserted into the handle connection component 65.

At the handle supporter casing 64, a handle rotary component accommodation groove (67 in FIG. 6) in which a predetermined inner space is formed and the handle rotary component 63 extending from the handle coupling component 62 is accommodated is further formed.

As the handle rotary component 63 is partially accommodated in the handle rotary component accommodation groove 67, the handle lever 61 can be supported by the handle supporter casing 64.

Meanwhile, the handle supporter casing 64 includes a first supporter casing 641 and a second supporter casing 642. When viewed from the front, the first supporter casing 641 and the second supporter casing 642 are configured to be laterally separable. As the first supporter casing 641 and the second supporter casing 642 are coupled to each other, the handle rotary component 63 is coupled to the handle connection component 65 formed at upper surfaces of the first and second supporter casings 641 and 642.

In other words, the casing 64 is formed by the coupling of the first and second supporter casings 641 and 642, and when the handle rotary component 63 is interposed between the first and second supporter casings 641 and 642, the upper end of the handle rotary component 63 is coupled to the handle connection component 65, such that the handle rotary component 63 is rotatably supported by the handle supporter casing 64.

In addition, a fastening hole is formed at the handle coupling component 62 to have a fastening member for coupling to the second handle 44 fastened, and a fastening hole to have the fastening member penetrate therethrough and be fastened to the fastening hole above is formed at the handle supporter casing 64. If the fastening member is fastened to the fastening hole by penetrating therethrough, the handle supporter casing 64, the handle coupling component 62, and the second handle 44 are coupled as the same fastening member penetrates therethrough.

Figure 6:
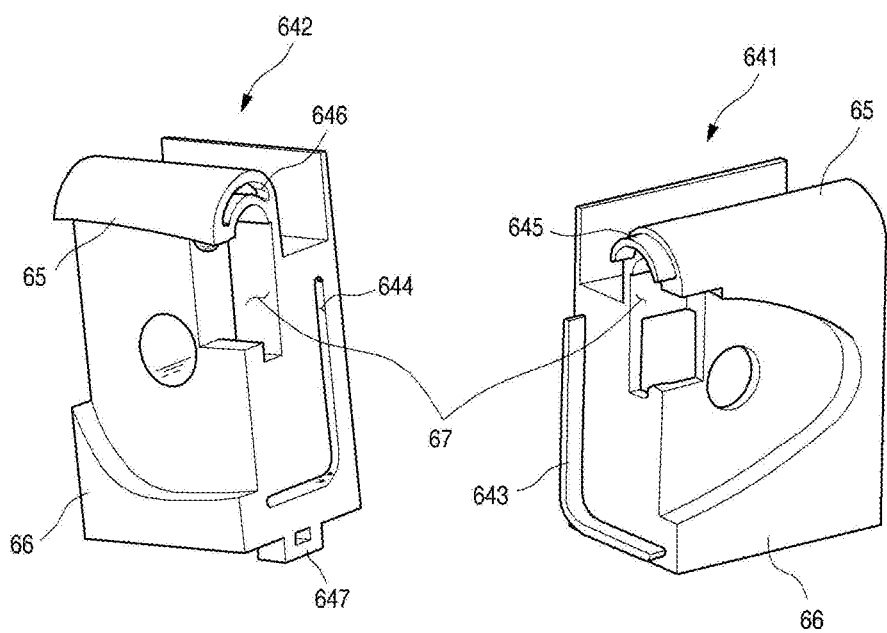
FIG. 6 is a rear perspective view illustrating a configuration of a casing of a supporter of a cooking appliance according to an implementation of the present disclosure.

FIG. 6 is an exploded perspective view illustrating a configuration of the supporter that supports the handle coupled to the door of the cooking appliance according to an implementation of the present disclosure.

Referring to FIG. 6, the handle supporter casing 64 includes the first supporter casing 641 and the second supporter casing 642, portions of the handle connection component 65 and the support unit 66 are formed at the first supporter casing 641, and the other portions of the handle connection component 65 and the support unit 66 are formed at the second supporter casing 642.

As above, the first and second supporter casings 641 and 642 are coupled to each other as the handle rotary component 63 of the handle lever 61 is interposed therebetween, such that the handle lever 61 is rotatably supported.

Referring to FIG. 6, guides 643 and 645 for guiding positions to be coupled to the second supporter casing 642 are formed at the first supporter casing 641 by protruding toward the second supporter casing 642, and guide accommodation grooves 644 and 646 for having the guides 643 and 645 accommodated therein and guiding positions to be coupled to the first supporter casing 641 are formed at the second supporter casing 642.

The guides 643 and 645 respectively protrude from side surfaces of the support unit 66 and the handle connection component 65 formed at the first supporter casing 641 toward the second supporter casing 642, and the guide accommodation grooves 644 and 646 are respectively recessed from side surfaces of the support unit 66 and the handle connection component 65 formed at the second supporter casing 642 to correspond to the opposite of the protruding direction of the guides 643 and 645.

Hereinafter, for convenience in giving a description, the guide 645 provided at the handle connection component 65 formed at the first supporter casing 641 is called a second guide, and the guide 643 provided at the support unit 66 is called a first guide.

In addition, the guide accommodation groove 644 provided at the support unit 66 formed at the second supporter casing 642 is called a first guide groove, and the guide accommodation groove 646 provided at the handle connection component 65 is called a second guide groove.

Regardless of how the guides 643 and 645 and the guide accommodation grooves 644 and 646 are called, it is preferable that the first and second supporter casings 641 and 642 be smoothly coupled to each other by the coupling between the guides 643 and 645 and the guide accommodation grooves 644 and 646.

In addition, only one of the guides 643 and 645 may be included. In this case, one of the guide accommodation grooves 644 and 646 corresponding to the one of the guides 643 and 645 to have the one of the guides 643 and 645 accommodated therein may be formed.

The second guide 645 formed at the handle connection component 65 of the first supporter casing 641 protrudes toward the second supporter casing 642 while being formed in an arch shape when viewed from the side, and the first guide 643 formed at the support unit 66 is formed along a part of a side edge portion of the support unit 66 to protrude toward the second supporter casing 642 while being formed in an "L" shape when viewed from the side.

The first and second guides 643 and 645 may be formed in shapes different from the above. However, in this case, it is preferable that the first and second guide grooves 644 and 646 be formed to correspond to other shapes of the first and second guides 643 and 645.

In addition, a casing coupling unit 647 for coupling the first and second supporter casings 641 and 642 to each other is formed at lower surfaces of the first and second supporter casings 641 and 642. The casing coupling unit 647 may be formed to maintain a coupling force between the first and second supporter casings 641 and 642 when the first and second supporter casings 641 and 642 are coupled to each other as the first and second guides 643 and 645 are accommodated in the first and second guide grooves 644 and 646.

The casing coupling unit 647 is formed in a shape of a hook. The casing coupling unit 647 is formed in a shape of a hook holder at a lower surface of the second supporter casing 642, and is formed in a shape of a hook protrusion at a lower surface of the first supporter casing 641.

The coupling force is generated as the portion formed in the shape of the hook protrusion at the lower surface of the first supporter casing 641 is fitted and coupled to the portion formed in the shape of the hook holder at the lower surface of the second supporter casing 642. By the coupling force of the casing coupling unit 647, the coupling force between the first and second supporter casings 641 and 642 may be maintained.

Hereinafter, a configuration of a cooking appliance according to another implementation of the present disclosure will be described with reference to FIGS. 7 and 8.

Figure 7:
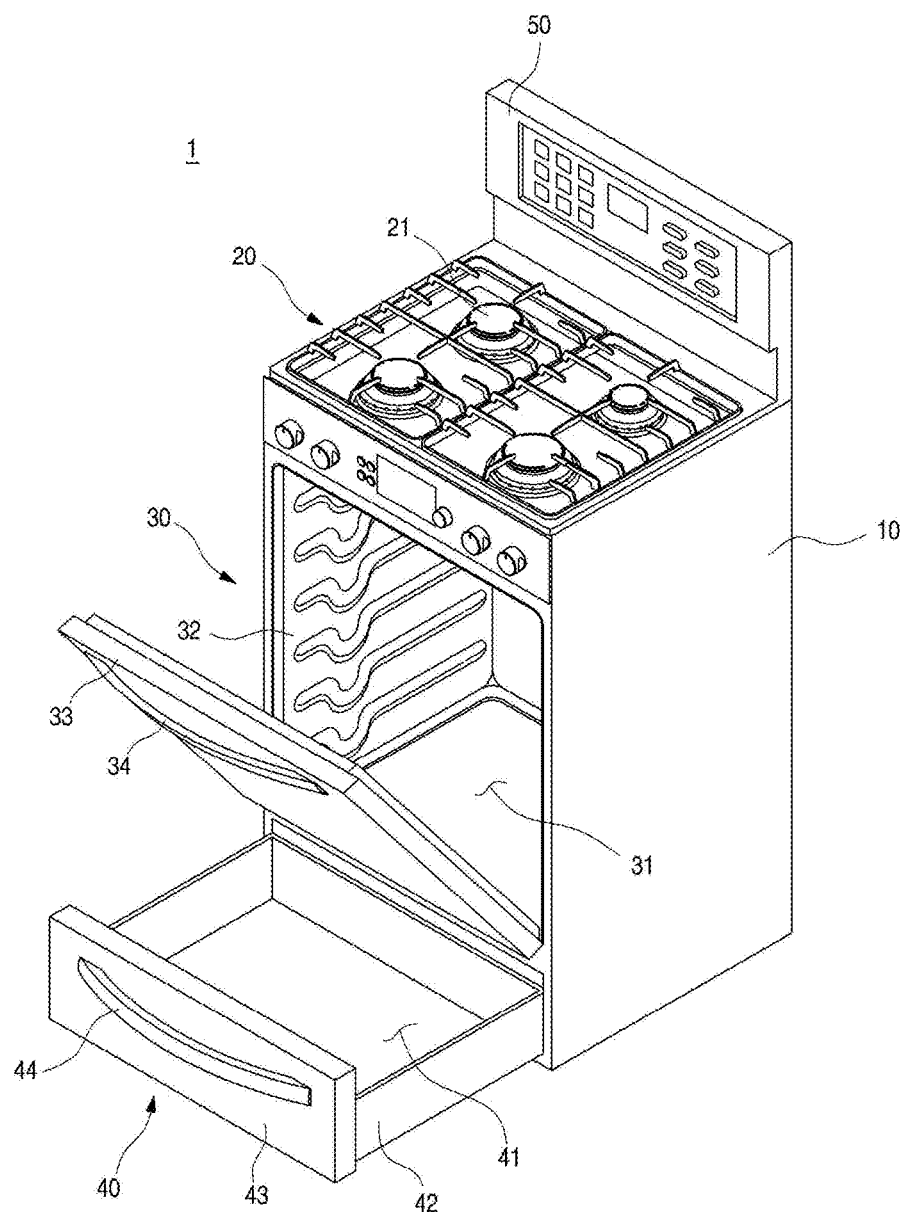
FIG. 7 is a perspective view illustrating a configuration of a cooking appliance according to another implementation of the present disclosure.
Figure 8:
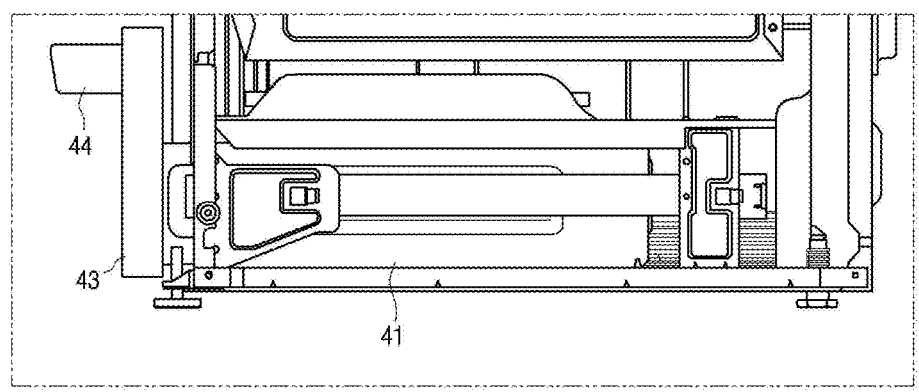
FIG. 8 is a partial side cross-sectional view illustrating an inner configuration of a drawer unit of a cooking appliance according to another implementation of the present disclosure.

FIG. 7 is a perspective view illustrating an exterior of the cooking appliance according to another implementation of the present disclosure, and FIG. 8 is a partially cut-away side cross-sectional view illustrating a configuration of a drawer unit of the cooking appliance according to another implementation of the present disclosure.

Referring to FIGS. 7 and 8, the cooking appliance 1 according to another implementation of the present disclosure may include a cooktop unit 20, an oven unit 30, the drawer unit 40, and a control unit 50. The cooktop unit 20 is disposed at an upper end of the cooking appliance 1, the oven unit 30 is disposed below the cooktop unit 20, the drawer unit 40 is disposed below the oven unit 30, and the control unit 50 is disposed at a rear portion of the cooktop unit 20.

A plurality of cooktop burners 21 may be mounted on the cooktop unit 20. The plurality of cooktop burners 21 are portions that heat food or a food container and cook food by combustion heat of flames generated after burning gas being supplied.

Hereinafter, descriptions on the cooktop unit 20 and the oven unit 30 will be omitted since the descriptions are similar with or identical to those mentioned above, and the drawer unit 40 will be examined.

In addition, in another implementation of the present disclosure, the oven unit 30 may be called a first cooking unit, the drawer unit 40 may be called a second cooking unit, a cavity of the oven unit 30 may be called a first cavity, and a cavity of the drawer unit 40 may be called a second cavity.

Hereinafter, for consistency of terminologies, descriptions will be given while the oven unit 30 is called the first cooking unit, the drawer unit 40 is called the second cooking unit, the cavity formed at the oven unit 30 is called the first cavity, and the cavity formed at the drawer unit 40 is called the second cavity.

The second cooking unit 40 is disposed at the lowermost portion of the cooking appliance 1 to accommodate food or a food container at an inner space thereof so as to store the food or the food container while maintaining a temperature of the food or the food container at a predetermined temperature.

The second cooking unit 40 includes a drawer having a second cavity 42 in which the second cooking compartment 41, that has a predetermined inner space and is capable of storing food or a food container, is formed, a second door 43 forming a front exterior of the drawer, and a second handle 44 rotatably mounted on a front surface of the second door 43.

The second cavity 42 is formed of a cuboid form in a shape of a quadrilateral box with an open upper surface, and food or a food container can be put into or taken out of the drawer through the open upper surface by a drawing motion of the drawer.

Like this, the first and second doors 33 and 43 open or close the open surfaces of the first and second cavities 32 and 43 by different motions. In other words, the first door 33 rotates to open or close the open surface of the first cavity 32, and the second door 43 opens or closes the open surface of the second cavity 42 by drawing the drawer out.

In addition, the first cavity 32 has a front surface thereof open so that food or a food container can be put in or taken out through the open front surface, and the second cavity 42 has an upper surface thereof open so that food or a food container can be put in or taken out through the open upper surface.

The second door 43 is disposed at a front surface of the drawer, and the second handle 44 is mounted at the second door 43. The second door 43 is formed of a quadrilateral plate that has a predetermined thickness and forms the front exterior of the drawer.

The second handle 44 is formed of a rod that has a predetermined thickness and width, and has a central portion protruding toward a direction in which the drawer is drawn while having a predetermined curvature.

Hereinafter, a configuration of a door of the cooking appliance according to another implementation of the present disclosure will be described with reference to FIGS. 9 and 10.

Figure 9:
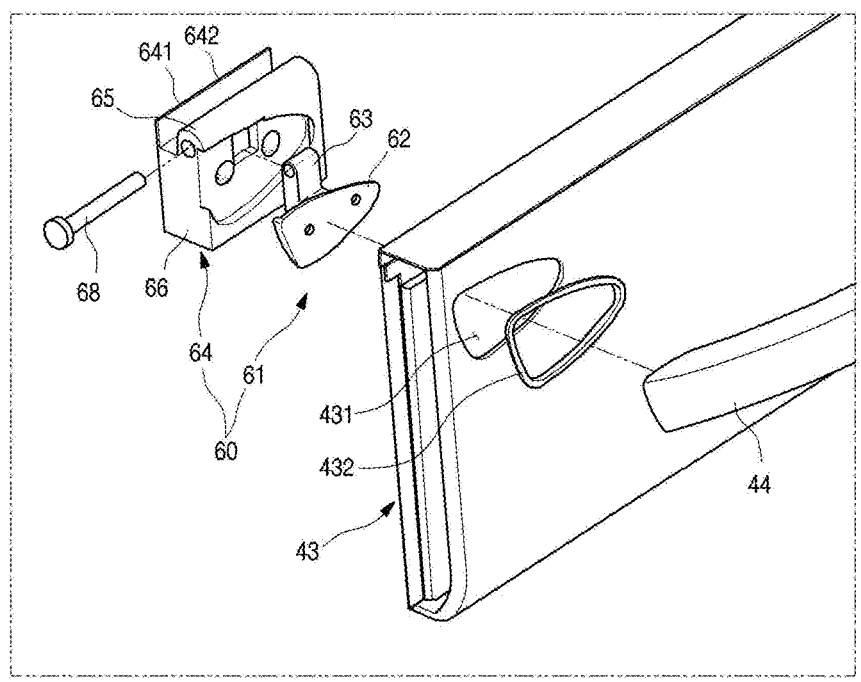
FIG. 9 is an exploded perspective view illustrating a coupling between a handle and a supporter mounted on a door of a cooking appliance according to another implementation of the present disclosure.
Figure 10:
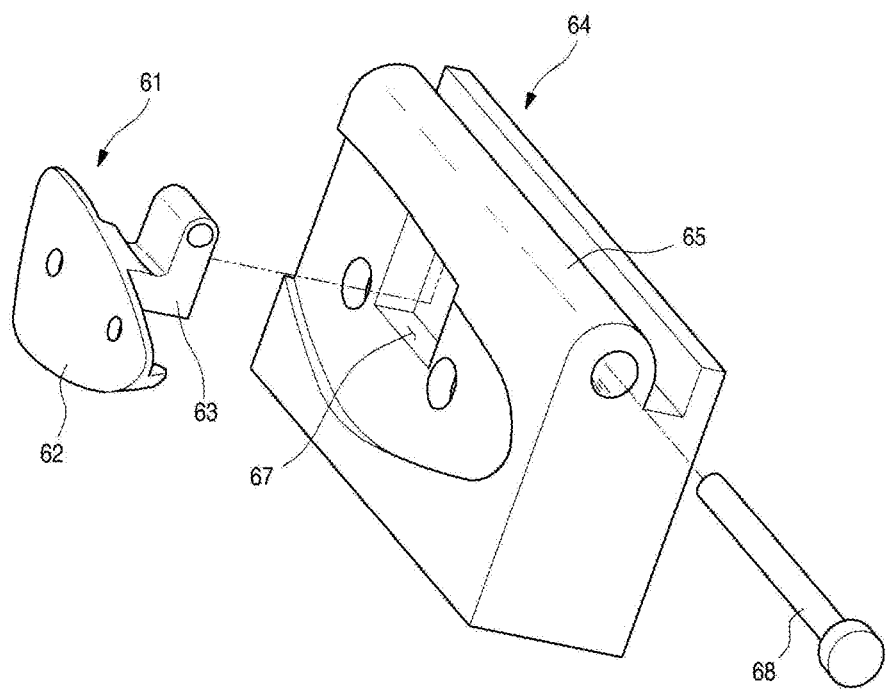
FIG. 10 is a rear fastening perspective view illustrating a configuration of a supporter of a cooking appliance according to another implementation of the present disclosure.

FIG. 9 is an exploded perspective view illustrating a configuration of a supporter that supports a handle mounted on a door of the cooking appliance according to another implementation of the present disclosure, and FIG. 10 is a rear fastening view illustrating a configuration of the supporter of the cooking appliance according to another implementation of the present disclosure.

Referring to FIGS. 9 and 10, the cooking appliance 1 according to another implementation of the present disclosure includes at least one of the first and second handles 34 and 44 rotatably mounted on at least one of the first and second doors 33 and 43 with respect to the at least one of the first and second doors 33 and 43, and a supporter 60 configured to rotatably support at least one of the first and second handles 34 and 44 with respect to at least one of the first and second doors 33 and 43.

The supporter 60 that supports at least one of the first and second handles 34 and 44 may be mounted on both of the first handle 34 and the second handle 44, or may be mounted on only one of the two.

However, the supporter 60 may be mounted on any one of the first and second handles 34 and 44, and since a configuration of the supporter 60 mounted on the first handle 34 and a configuration of the supporter 60 mounted on the second handle 44 are similar with or identical to each other, the configuration of the supporter 60 mounted on the second handle 44 will be described hereinafter as an example.

The second handle 44 is rotatably supported by the supporter 60 with respect to the second door 43, such that the second handle 44 rotates by a predetermined angle when a user grips the second handle 44 to slide the drawer, thereby relieving a physical burden on the user.

The supporter 60 includes a handle lever 61 coupled to the second handle 44, a casing 64 that rotatably supports the handle lever 61, and a fastening member 68 that connects the handle lever 61 to the casing 64.

The supporter 60 is disposed at the inner space of the second door 43, and the supporter 60 and the second handle 44 are fixed to and mounted on the second door 43 while being fastened by the same fastening member.

The coupling hole 431 is formed at the second door 43, and the coupling hole 431 provides a path in which the handle lever 61 can partially move in front and rear directions.

As mentioned above, the handle lever 61 includes the handle coupling component 62 and the handle rotary component 63, and the casing 64 includes the handle connection component 65 and the support unit 66.

In addition, in another implementation of the present disclosure, the fastening member 68 for connecting the handle lever 61 to the casing 64 is included. The fastening member 68 performs a function of connecting the handle rotary component 63 to the handle connection component 65 of the casing 64.

The fastening member 68 is coupled by horizontally penetrating the handle connection component 65 and the handle rotary component 63, thereby connecting the handle rotary component 63 to the handle connection component 65.

If the handle rotary component 63 and the handle connection component 65 are coupled and connected to each other by the fastening member 68, the handle rotary component 63 is rotatably coupled to the casing 64 with the fastening member 68 as the center of rotation.

The fastening member 68 is formed of a pin formed in a shape of a round bar that has a predetermined diameter, and one end portion thereof is formed to have a greater diameter than a diameter of an insertion hole formed at the handle connection component 65 so as to limit the fastening range of the fastening member 68.

However, the fastening range of the fastening member 68 may also be limited by laterally forming a protrusion at the one end portion of the fastening member 68, blocking one end portion of the insertion hole formed at the handle connection component 65, or forming a protrusion at one end portion of the insertion hole.

Figure 11:
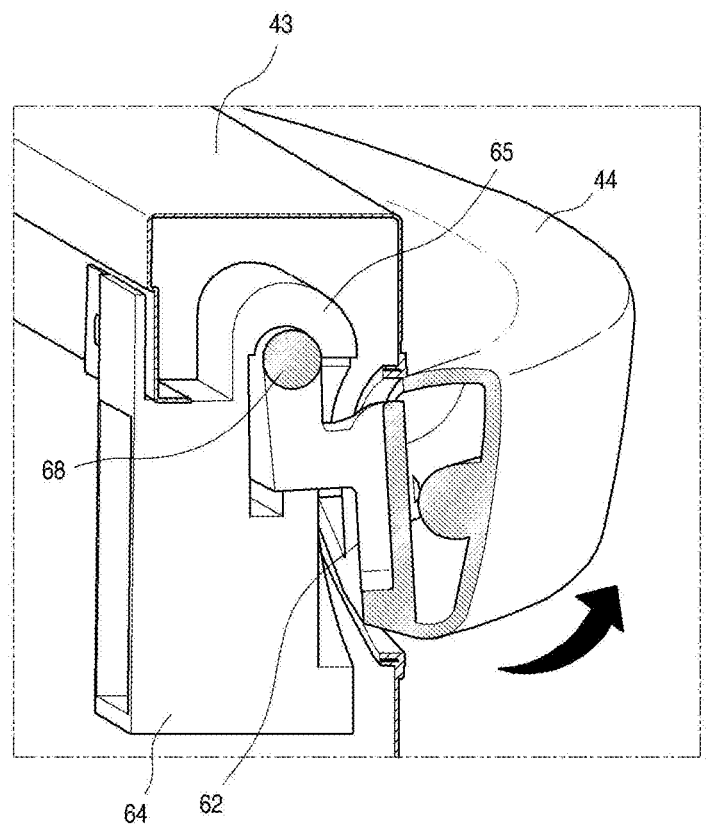
FIG. 11 is a partially cut-away perspective view illustrating motions of a door handle and a supporter of a cooking appliance according to some implementations of the present disclosure.

Hereinafter, a motion of the cooking appliance configured as above will be examined with reference to FIG. 11. FIG. 11 is a partially cut-away side perspective view illustrating a motion of the handle of the cooking appliance according to an implementation of the present disclosure.

Referring to FIG. 11, when a user grips the second handle 44 to open the open surface of the cavity 42, the user moves the second door 43 forward.

Here, the second handle 44 mounted on the second door 43 rotates by a predetermined angle with respect to the front surface of the second door 43. In other words, when the user grips and moves the second handle 44, the handle rotary component 63 rotates with the fastening member 68 as the center of rotation, and the handle coupling component 62 coupled to the handle 44 moves along a track formed in a shape of a quadratic curve, such that the second handle 44 rotates by a predetermined angle with respect to the front surface of the second door 43.

Like this, when the handle rotary component 63 rotates with the fastening member 68 as the center of rotation while being fastened to the handle connection component 65 by the fastening member 68, a lower end portion of the handle rotary component 63 moves toward the coupling hole 431 while being accommodated in the handle rotary component accommodation groove 67, such that the lower end portion moves while drawing a motion track formed in a shape of a quadratic curve.

If the lower end portion of the handle rotary component 63 moves while drawing the motion track formed in the shape of a quadratic curve, the handle coupling component 62 connected to the handle rotary component 63 moves while drawing a motion track formed in a shape of a quadratic curve, and by the motion of the handle coupling component 62, the second handle 44 rotates by a predetermined angle with respect to the second door 43.

In some implementations, a cooking appliance may be configured with other features that improve the convenience of opening and closing a drawer of a cooking appliance, in addition or as an alternative to the features described above.

For example, a cooking appliance may be configured to provide damping and automatic closing of a drawer disposed at an oven of a cooking appliance when the drawer is inserted. This may enable the cooking appliance to automatically close the drawer based on a user partially inserting the drawer and without requiring the user to fully insert the drawer into the cooking appliance. As such, in some scenarios, this may improve the convenience in using the cooking appliance.

Figure 12:
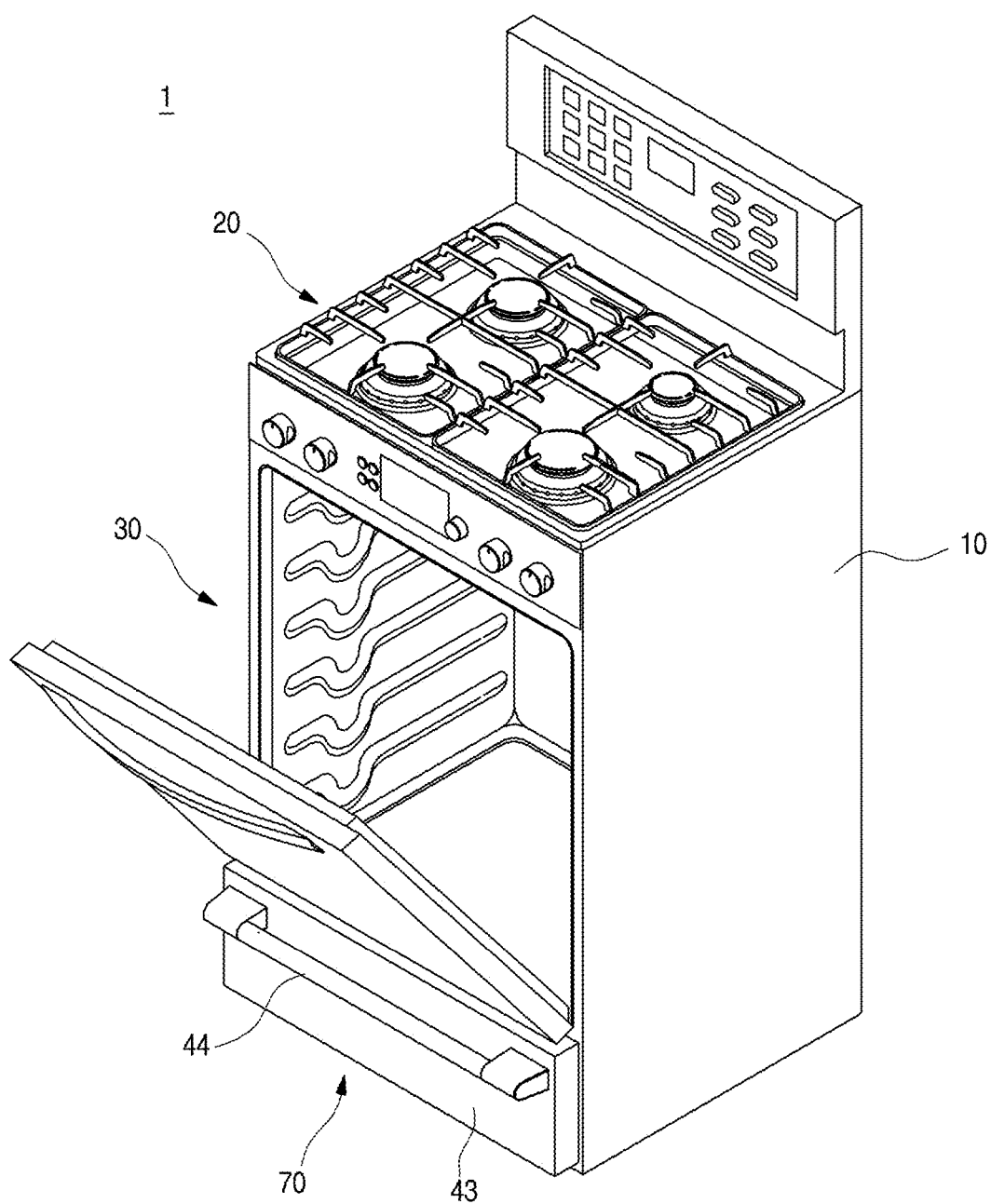
FIG. 12 is a perspective view of a cooking appliance according to another implementation of the present disclosure.

FIG. 12 is a perspective view of a cooking appliance according to another implementation of the present disclosure.

As shown in FIG. 12, an exterior of a cooking appliance 1 according to some implementation may be formed by an outer case 10, and the cooking appliance 1 may include a cooktop unit 20, an oven unit 30, and a drawer unit 70. The drawer unit 70 is configured to store cooked food in a warm state or to slightly heat the cooked food, and may be disposed below the oven unit 30.

Figure 13:
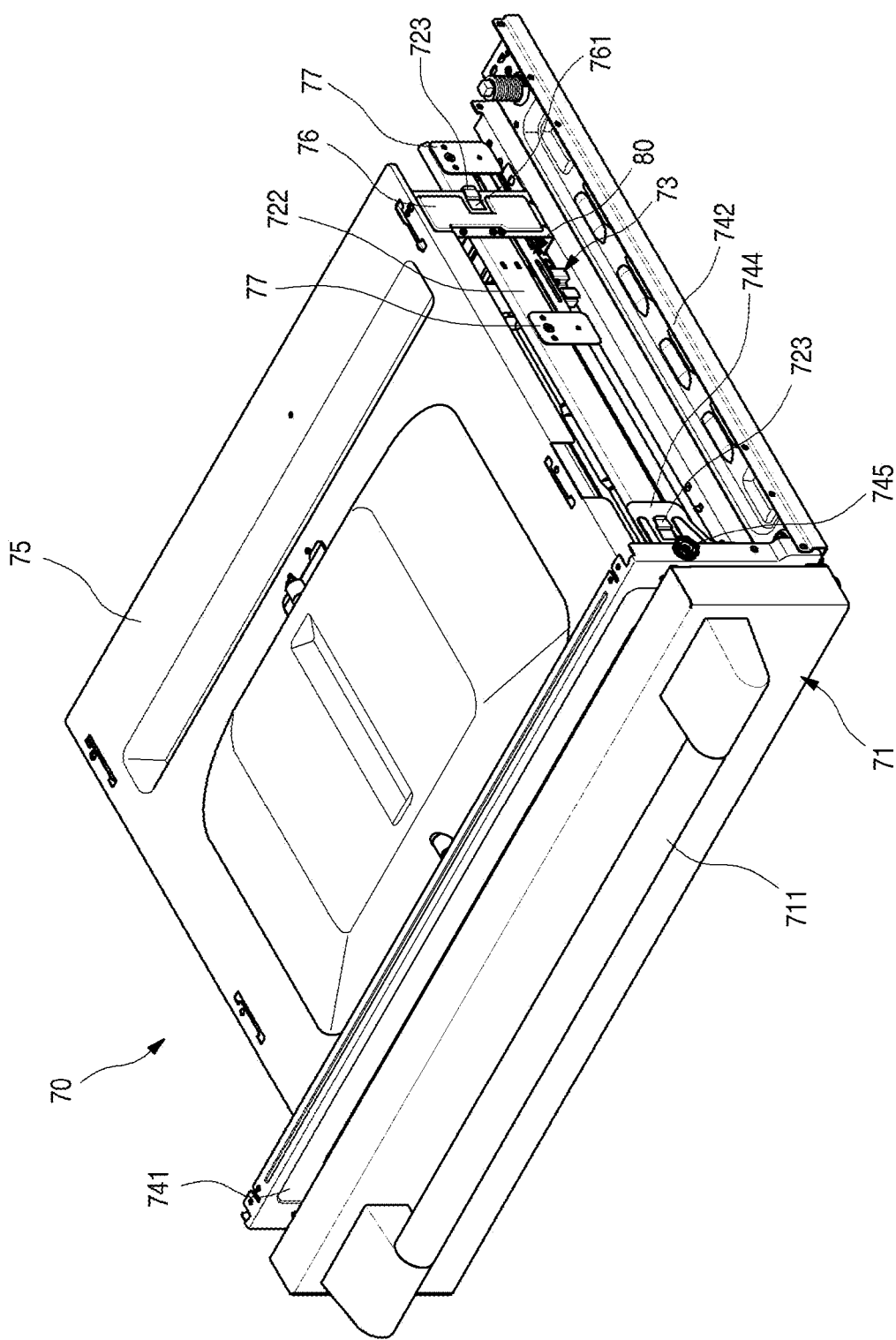
FIG. 13 is a perspective view of a drawer unit of a cooking appliance.
Figure 14:
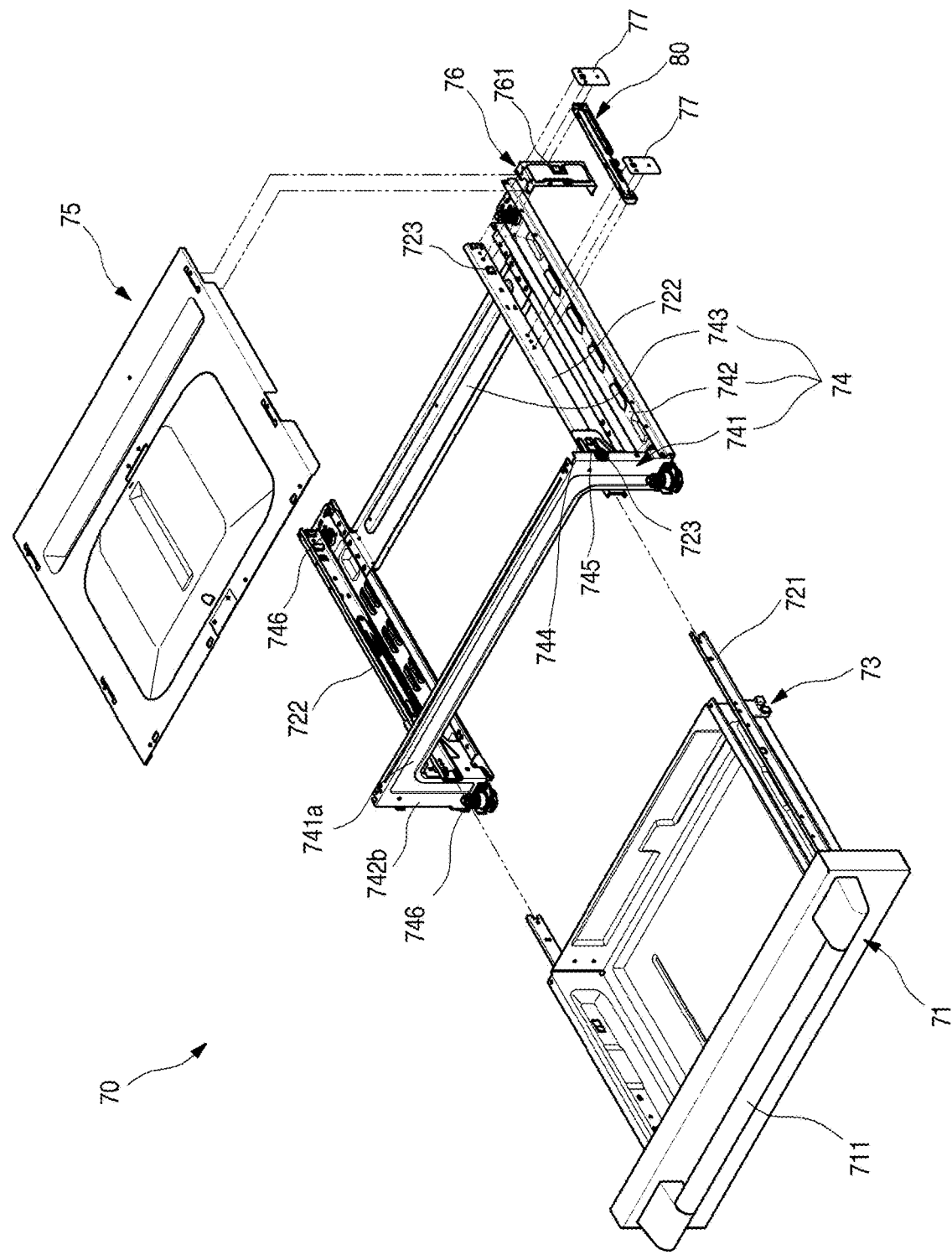
FIG. 14 is an exploded perspective view of a drawer unit.

FIG. 13 is a perspective view of a drawer unit of the cooking appliance. In addition, FIG. 14 is an exploded perspective view of the drawer unit. In addition, FIG. 15 is a side view of the drawer unit.

Figure 15:
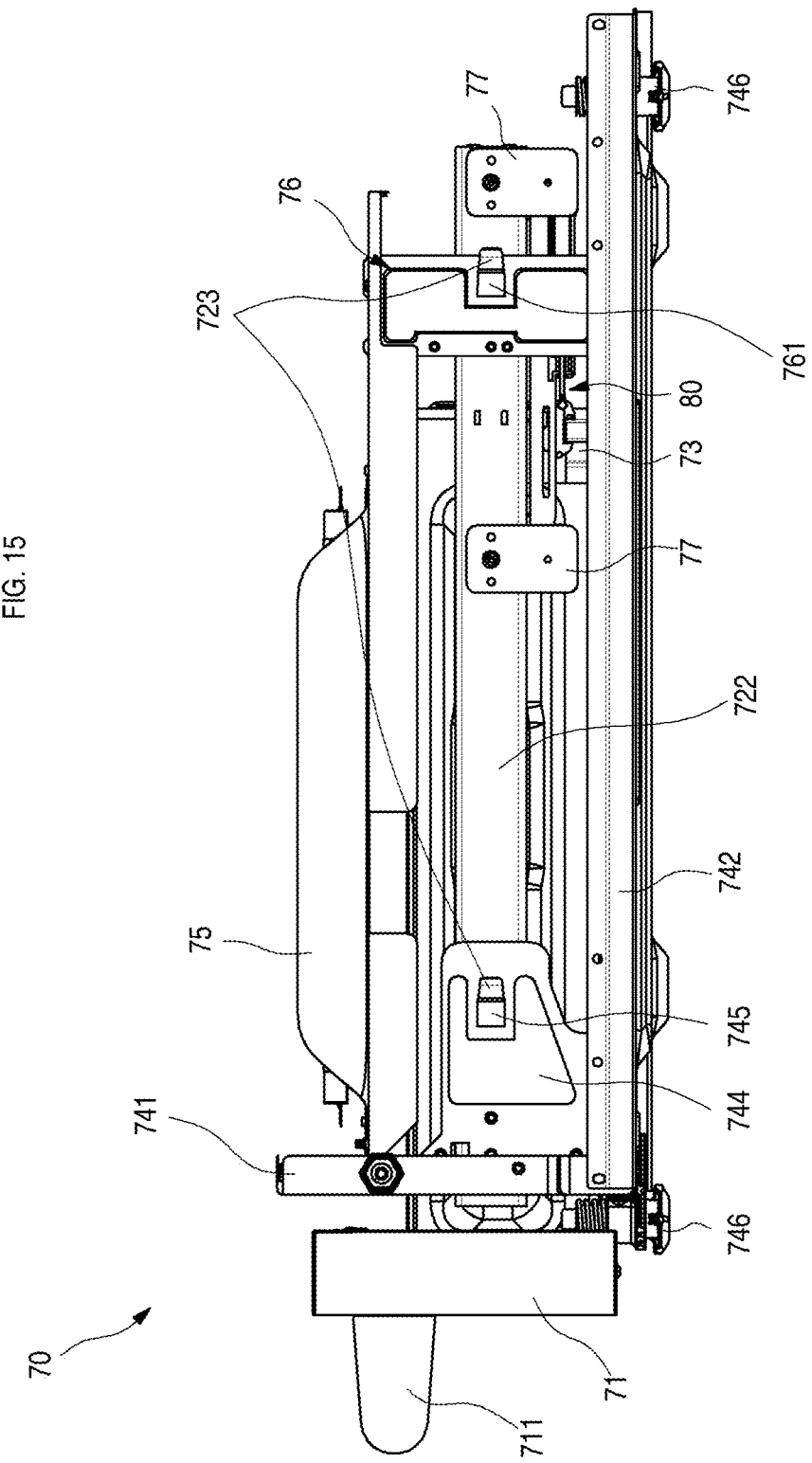
FIG. 15 is a side view of a drawer unit.

As shown in FIGS. 13 to 15, the drawer unit 70 may include a drawer 71 in which food is stored, and a frame 74 forming a space from or into which the drawer 71 is withdrawn or inserted.

A handle 711 may be disposed at a front surface of the drawer 71, and the front surface of the drawer 71 forms a portion of the front exterior of the cooking appliance 1 while the drawer 71 is closed. In addition, first rails 721 for guiding the withdrawal or insertion of the drawer 71 may be disposed at both side surfaces of the drawer 71. The first rails 721 are accommodated inside second rails 722 to be described below, and are configured to be slidable along the second rails 722. Although implementations are described in which the drawer 71 is withdrawn or inserted by a two-stage configuration of first rails 721 and second rails 722, the cooking appliance 1 may be configured with various types of rail structures that are withdrawn in multiple stages.

In some implementations, a link 73 may be disposed at one side of each of the first rails 721. The link 73 moves in accordance with the withdrawal or insertion of the drawer 71, and is interlocked with a sliding control assembly 80 to be described below to enable damping and automatic closing actions of the sliding control assembly 80.

The frame 74 may be mounted on the outer case 10 forming the exterior of the cooking appliance 1, and forms a space from or into which the drawer 71 is withdrawn or inserted. The frame 74 may include a front frame 741 forming an opening through which the drawer exits or enters, side frames 742 disposed at both sides of the front frame, and a rear frame 743 connecting the side frames 742.

In more detail, the front frame 741 may include a horizontal portion 741a which extends horizontally, and vertical portions 742b formed by bending both ends of the horizontal portion 741a downward and extending them. Consequently, an opening may be defined by the horizontal portion 741a and the vertical portions 742b, and the drawer 71 may be disposed inside the opening.

The front frame 741 may be formed to have a predetermined width and come in contact with a front portion of the drawer 71 when the drawer 71 is closed. In addition, the front frame 741 may form a portion of the outer case 10, and may be structured to prevent distortion of the outer case 10.

In addition, rail mounting units 744 extending rearward may be formed at the vertical portions 742b at both sides of the front frame 741. First mounting holes 745 may be further formed at the rail mounting units 744 to enable the second rails 722 to be fixed thereto and mounted thereon.

The side frames 742 may be coupled to the vertical portions 742b of the front frame 741, and extend rearward. The side frames 742 may form both sides of a floor surface of the cooking appliance 1, and legs 746 supporting the floor surface may be disposed at the side frames 742. In addition, the side frames 742 may be bent multiple times to support the weight of the cooking appliance 1, and formed to prevent deformation due to distortion at the same time.

The rear frame 743 may be formed to cross between the side frames 742 at both sides, and connect rear portions of the side frames 742. Both ends of the rear frame 743 may be coupled to the side frames 742 at both sides to prevent distortion of a space from or into which the drawer 71 is withdrawn or inserted. In addition, the rear frame 743 may also be bent multiple times or have a structure formed to reinforce the strength thereof.

A cover 75 may be disposed at an upper end of the front frame 741. The cover 75 forms a top surface of a space in which the drawer 71 is accommodated, and covers the drawer 71 from the top when the drawer 71 is inserted. In addition, a heater may be disposed at the cover 75, and food inside the drawer 71 may be heated by the heater.

Supporters 76 may be disposed between the cover 75 and the side frames 742. The supporters 76 are disposed at rear portions of the cover 75 and the side frames 742 to connect the cover 75 to the side frames 742, and are configured to support the cover 75.

In addition, upper and lower ends of the supporters 76 may be bent to be fixed to the cover 75 and the side frames 742. In addition, second mounting holes 761 on which the second rails 722 are fixed and mounted may be formed at the supporters 76. In some implementations, forming parts are formed at surfaces on which the second mounting holes 761 are formed to prevent deformation of the supporters 76.

The second rails 722 may be fixed and mounted on the front frame 741 and the supporters 76. For example, mounting units 723 may be formed at side surfaces of the second rails 722. The mounting units 723 may be formed at front portions and rear portions of the second rails 722 corresponding to the first mounting holes 745 and the second mounting holes 761, and formed in the same shapes. In some implementations, the mounting units 723 have a structure configured to be restrained after being inserted into the first mounting holes 745 and the second mounting holes 761 and moving horizontally in one direction.

In some implementations, the second rails 722 accommodate the first rails 721, and a plurality of bearings are interposed between the first rails 721 and the second rails 722 such that the first rails 721 may be withdrawn or inserted from or into inner portions of the second rails 722 while sliding. Consequently, the second rails 722 may remain fixed to the front frame 741, and the first rails 721 may move together with the drawer 71 when the drawer 71 is withdrawn or inserted.

The drawer structure may be configured such that the drawer 71 is automatically closed based on the drawer 71 being partially inserted. The drawer structure may also provide dampening such that the drawer 71 is closed with reduced impact during such automatically closure. In some implementations, both the automatic closure and the dampening may be provided by a single sliding control assembly. For example, in FIGS. 13 to 15, sliding control assembly 80 may be configured to provide automatic closure and dampening of the drawer 71.

A sliding control assembly 80 may be disposed at rear portions of each of the second rails 722. The sliding control assembly 80 may be configured to mitigate impact when the drawer 71 is closed and also configured to enable the drawer 71 to be automatically closed based on the drawer 71 being partially inserted. The sliding control assembly 80 may be fixed to upper portions of each of the second rails 722 by brackets 77.

The brackets 77 are disposed at front ends and rear ends of the sliding control assembly 80. One ends of the brackets 77 may be coupled to the sliding control assembly 80, and the other ends of the brackets 77 may be coupled to the rear portions of the second rails 722, for example by screws or other attachment mechanisms.

Figure 16:
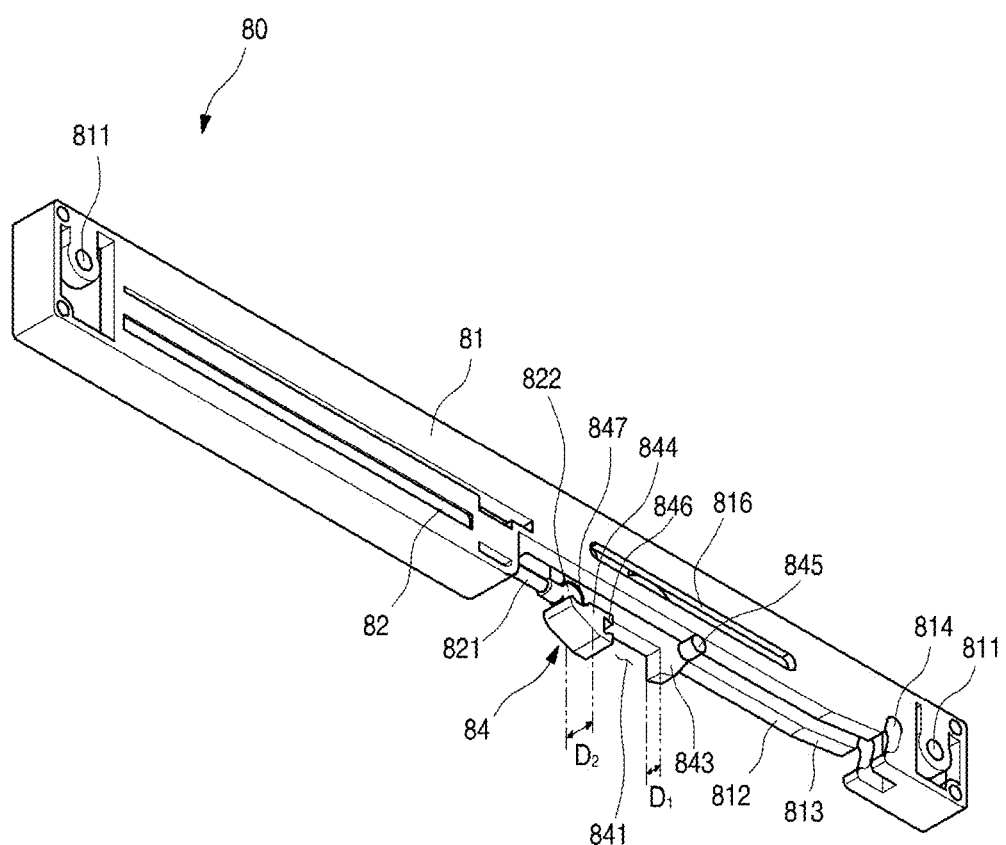
FIG. 16 is a perspective view of a sliding control assembly of a cooking appliance according to another implementation of the present disclosure.

FIG. 16 is a perspective view of a sliding control assembly of the cooking appliance according to another implementation of the present disclosure. In addition, FIG. 17 is a side view of the sliding control assembly.

Figure 17:
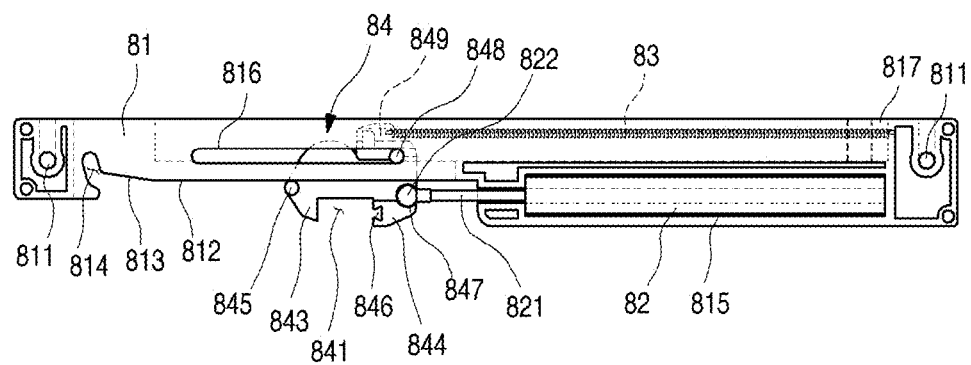
FIG. 17 is a side view of a sliding control assembly.

As shown in FIGS. 16 and 17, a sliding control assembly 80 may include a housing 81 forming an overall exterior, a damper 82 and an elastic member 83 disposed inside the housing 81, and a hook 84 connected to the damper 82 and the elastic member 83 and moved by the link 73.

In more detail, an upper surface and a lower surface of the housing 81 are open, and the housing 81 is configured to form a space in which the damper 82 and the elastic member 83 are accommodated. In addition, screw holes 811 to which the screws for coupling to the brackets 77 are fastened may be formed at front and rear ends of the housing 81.

In addition, a damper mounting unit 815 on which the damper 82 is mounted may be formed at a lower end of the housing 81. The damper mounting unit 815 may be formed in a shape protruding downward from the housing 81, and opened in the shape corresponding to the damper 82 to have the damper 82 inserted thereinto. In addition, the damper mounting unit 815 may be open toward the front, and formed to have a rod 821 withdrawn therefrom or inserted thereinto while mounted on the damper mounting unit 815.

Guide surfaces 812 and 813 may be formed at a lower end of the housing 81 in front of the damper mounting unit 815. The guide surfaces 812 and 813 are configured to guide a motion of the hook, and may be formed to enable a locking protrusion 845 of the hook 84 to move in front and rear directions while the locking protrusion 845 of the hook 84 comes in contact with the guide surfaces 812 and 813.

The guide surfaces 812 and 813 may include a first surface 812 which extends horizontally from a front end of the damper mounting unit 815, and a second surface 813 formed to be tilted upward from the front end of the first surface 812. In addition, a locking groove 814 which is recessed upward may be formed at the front end of the second surface 813. The second surface 813 may be formed to have a gentle slope so that the locking protrusion 845 of the hook 84 which passes through the first surface 812 can smoothly enter an inner portion of the locking groove 814.

The locking groove 814 may be configured to guide rotation of the hook 84, and may be recessed upward from an end portion of the second surface 813 and formed to have a predetermined slope. The slope of the locking groove 814 may, in some implementations, be steeper than the second surface 813, and has an angle which enables the hook 84 to rotate so that the link 73 may be detached from a hook groove 841.

Specifically, in some scenarios, the slope and depth of the locking groove 814 may be configured such that a front end of the hook groove 841 is disposed at the same height as or higher than a lower end of the housing 81 and a rear end of the hook groove 841 is disposed lower than the lower end of the housing 81 to protrude when the hook 84 is disposed inside the locking groove 814 and rotated. Consequently, in such scenarios, the link 73 may be easily detached from the hook groove 841 and the link 73 may be accommodated inside the hook groove 841 again at the same time.

In addition, a guide unit 816 is formed above the guide surfaces 812 and 813. The guide unit 816 may be open or recessed to accommodate a stopper 848 of the hook 84, or extend toward the front and rear in a direction in which the hook 84 moves to guide the motion of the hook 84.

The length of the guide unit 816 may be formed to correspond to a sliding motion of the rod 821 of the damper 82, and the guide unit 816 performs an actual function of the stopper 848 of the hook 84. For example, the stopper 848 is disposed at a front end of the guide unit 816 when the hook 84 moves forward and the locking protrusion 845 is disposed inside the locking groove 814, and the stopper 848 is disposed at a rear end of the guide unit 816 at a position at which the drawer 71 is inserted and closed and the hook 84 cannot move toward the rear any more.

An elastic member 83 may be accommodated inside the housing 81 above the damper 82. A tension spring is an example of the elastic member 83, although implementations are not limited thereto and may include other forms of elastic members. One end of the elastic member 83 may be fixed to the hook 84 and the other end may be fixed to the housing 81 such that the elastic member 83 is tensioned when the hook 84 moves forward to enable the hook 84 and the damper 82 to return by an elastic restoring force. As such, the drawer 71 may be automatically closed.

The hook 84 may be accommodated in an inner surface of the housing 81. One portion of the hook 84 may be accommodated inside the housing 81, and the other portion thereof may be formed to protrude downward and be exposed through an open lower surface of the housing 81.

The hook groove 841 into which the link 73 is configured to be inserted may be formed at a lower surface of the hook 84. The hook groove 841 may be defined by a front contact portion 843 extending downward from a front end of the hook 84, and a rear contact portion 844 extending from a rear end of the hook 84. For example, the hook groove 841 may be formed by a space or cavity between the front contact portion 843 and the rear contact portion 844 which protrude downward.

The depth D1 of the front contact portion 843 may be formed with a depth that can be indented in a connecting hole 736 to be described below, and formed to have a depth which corresponds to the width W in which the connecting hole 736 is open.

A front end of the front contact portion 843 may be formed to be tilted, and formed to avoid interference with the inner surface of the housing 81 when the hook 84 rotates. In addition, the locking protrusion 845 may protrude in both directions at an end portion of the front contact portion 843, i.e., the front end of the hook 84.

A mitigation unit 846 for mitigating an impact upon contact with the link 73 may be further formed at a front end of the rear contact portion 844, i.e., an inner surface of the hook groove 841. The mitigation unit 846 is formed in the shape of a groove such that portions other than the mitigation unit 846 may come in contact with the link upon contact with the link. In addition, a separate member for mitigation may be disposed inside the hook groove 841.

In addition, the depth D2 of the rear contact portion 844 may be formed thicker than the depth D1 of the front contact portion 843. For example, the depth D2 of the rear contact portion 844 is formed greater than the width W in which the connecting hole 736 is open such that the rear contact portion 844 is not indented in the connecting hole 736 of the link when the rear contact portion 844 comes in contact with the link 73.

A joint connection portion 847 may be formed at the rear end of the hook 84. The joint connection portion 847 is a portion in which a ball joint 822 disposed at a front end of the rod 821 is accommodated, and the hook 84 becomes rotatable with respect to the joint connection portion 847 by being coupled to the ball joint 822.

The stopper 848 which protrudes toward both sides of the hook 84 may be formed above the joint connection portion 847. The stopper 848 is accommodated inside the guide unit 816. In addition, a hook side fixing unit 849 to which one end of the elastic member 83 is fixed may be formed above the stopper 848. The elastic member 83 may have one end thereof fixed to the hook side fixing unit 849 and the other end thereof fixed to a housing side fixing unit 817 which is formed at the housing 81

Figure 18:
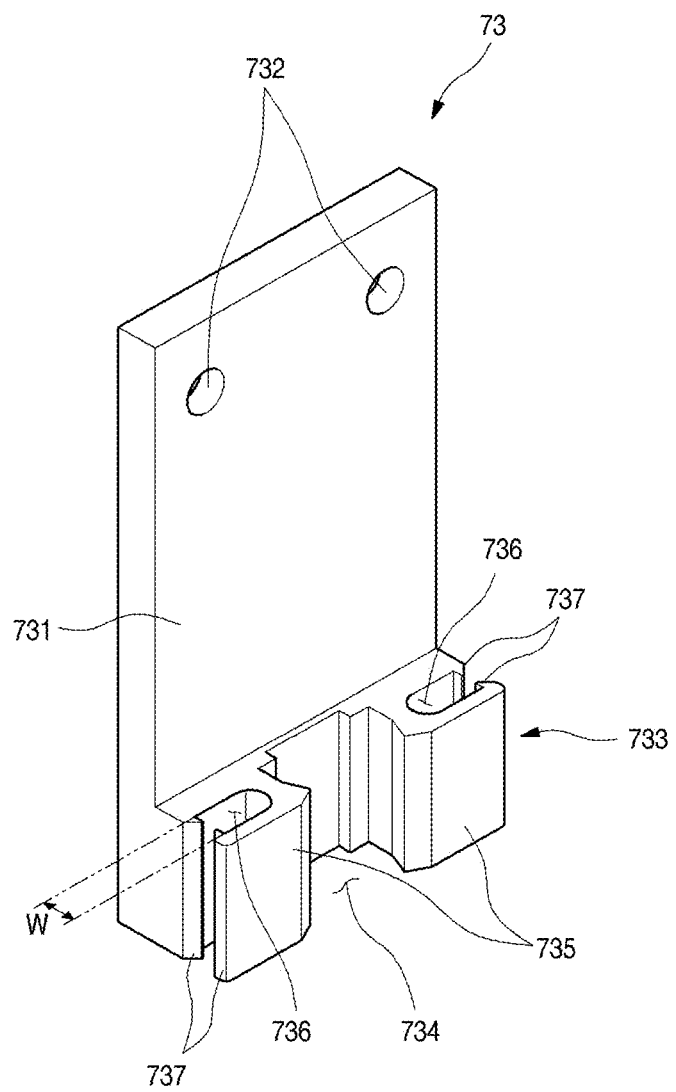
FIG. 18 is a perspective view of a link of a cooking appliance according to another implementation of the present disclosure.

FIG. 18 is a perspective view of a link of the cooking appliance according to another implementation of the present disclosure.

As shown in FIG. 18, the link 73 may be formed of a resin material such as a plastic, and configured with a fixed unit 731 to be fixed to the first rails 721, and a holder unit 733 disposed at a lower end of the fixed unit 731.

Screw holes 732 to which the screws are fastened may be formed at the fixed unit 731 such that the fixed unit 731 is configured to be fixed to the first rails 721 by the screws. In addition, the fixed unit 731 may extend downward while the holder unit 733 may extend up to a position at which it contacts the hook 84.

The holder unit 733 may be formed with a greater thickness than the fixed unit 731 to facilitate contact with and accommodation of the hook 84. A recessed part 734 is formed at the center of the holder unit 733. The recessed part 734 is recessed inward and vertically open such that the front contact portion 843 of the hook 84 may be accommodated therein.

Connecting parts 735 are formed at both sides of the recessed part 734. The connecting parts 735 may be formed with a size configured to be accommodated in the hook groove 841, and are interlocked in accordance with the motion of the link 73 to enable the hook 84 to move together with the link 73.

The connecting parts 735 are configured to re-align a position of the hook 84, for example in scenarios in which the hook 84 and link 73 are not interlocked. Such scenarios may occur, for example, in an abnormal situation in which the cooking appliance is physically shaken or perturbed and the hook 84 is unable to be inserted into the recessed part 734. In such scenarios, one of the connecting parts 735 may temporarily accommodate the hook 84 and guide the hook 84 into a position where it may be properly inserted into the recessed part 734.

In some implementations, each of the connecting parts 735 may be formed of a connecting hole 736 and tips 737. The connecting parts 735 may be formed in pairs, but only one of the connecting parts 735 will be described below. This pairwise formation of the connecting parts 735 may enable the same link 73 to be used for both left and right sides of the drawer structure. Consequently, only a structure of the connecting part 735 at one side will be described since the structures of the connecting parts 735 on both sides are the same.

The connecting hole 736 is formed by recessing a front or rear surface of the holder unit 733. The width W in which the recessed connecting hole 736 is open may be formed to correspond to the depth D1 of the front contact portion 843. Consequently, the front contact portion 843 may be formed to be inserted into the connecting hole 736.

In addition, the tips 737 protrude from both sides of an open inlet portion of the connecting hole 736 in directions facing each other. The tips 737 vertically extend along the opening of the connecting hole 736 and are tilted toward an inner portion of the connecting hole 736 such that the front contact portion 843 can be easily inserted into the connecting hole 736.

A distance between the tips 737 may be formed shorter than the depth of the front contact portion 843, such that the connecting part 735 is formed to be elastically deformed structurally when the front contact portion 843 is inserted, and the front contact portion 843 is indented in the connecting hole 736. For this, the thickness of the side surface of the connecting part 735 may be thin to be elastically deformed when the front contact portion 843 is indented.

Hereinafter, withdrawal and insertion actions of a drawer of the cooking appliance according to another implementation of the present disclosure having the above structure will be examined.

Figure 19A:
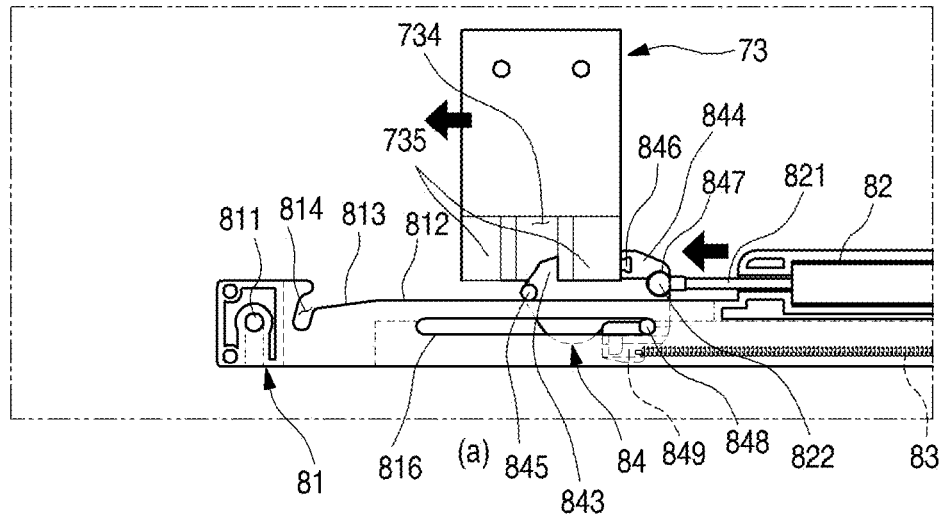
FIGS. 19(a) to 19(c) are views illustrating states of a sliding control assembly and a link in accordance with withdrawal or insertion of a drawer of a cooking appliance according to another implementation of the present disclosure.
Figure 19B:
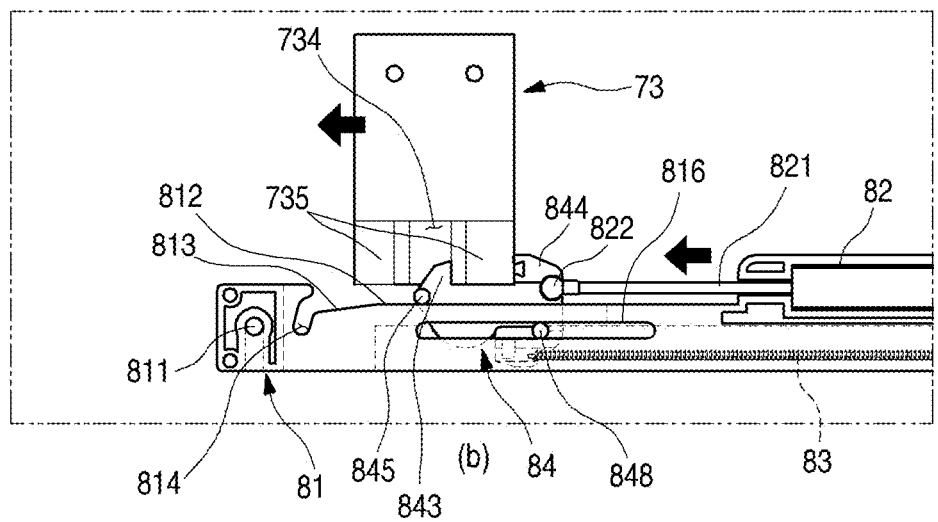
Figure 19C:
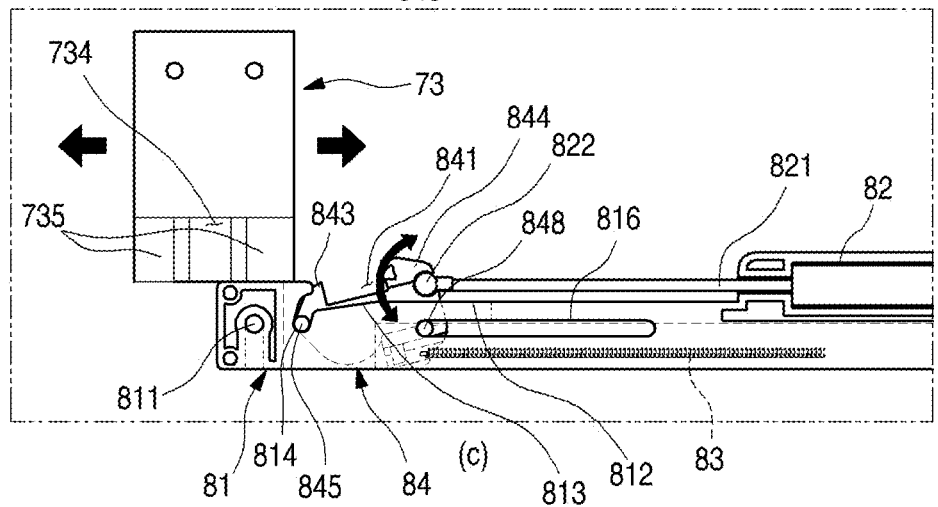
Figure 20:
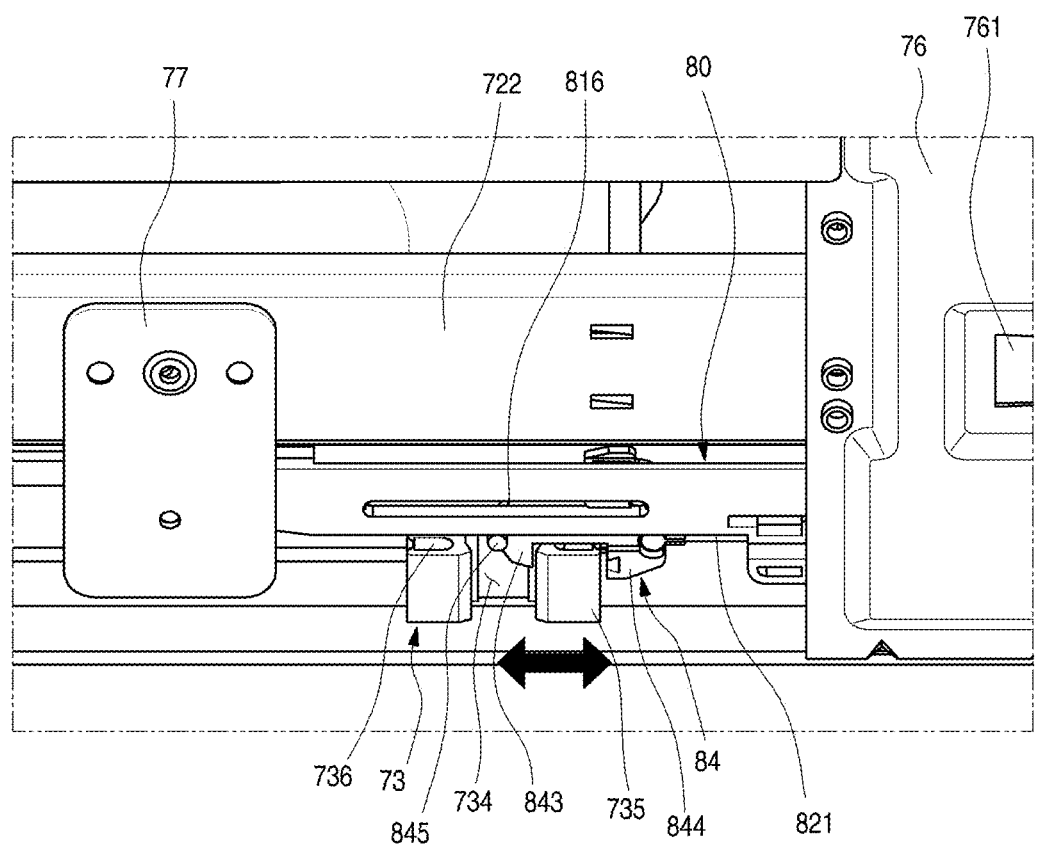
FIG. 20 is a partial perspective view illustrating an operation state of a sliding control assembly.

FIGS. 19(a) to 19(c) are views sequentially illustrating states of a sliding control assembly and the link in accordance with withdrawal or insertion of the drawer of the cooking appliance according to another implementation of the present disclosure. In addition, FIG. 20 is a partial perspective view illustrating an operation state of the sliding control assembly.

As shown in FIGS. 19(a) to 19(c) and 20(a) to 20(c), the stopper 848 is disposed at the rear end of the guide unit 816 and the locking protrusion 845 is disposed on the first surface 812 when the drawer 71 is closed as shown in FIG. 19(a). In addition, the rod 821 of the damper 82 is disposed at the rearmost portion, and the elastic member 83 remains in a state in which no external force is applied thereto. In addition, the front contact portion 843 of the hook 84 is accommodated in the recessed part 734, and the connecting part 735 is accommodated in the hook groove 841.

When a user holds the handle 711 and pulls the drawer 71 in the above state forward to open the drawer 71, the first rails 721 slide from the second rails 722 and are withdrawn forward, and the drawer 71 is also withdrawn forward.

Here, as shown in FIG. 19(b), the link 73 pulls and moves the hook 84 forward. The locking protrusion 845 moves along the first surface 812 and the second surface 813, and the stopper 848 moves along the guide unit 816.

The rod connected to the hook 84 moves forward together as the hook 84 moves forward, the elastic member 83 connected to the hook 84 is tensioned, and the elastic restoring force is increased.

When the drawer 71 is continuously withdrawn from the above state, the hook 84 also moves more forward with the link, and eventually moves until the stopper 848 is disposed at the front end of the guide unit 816 as shown in FIG. 19(c).

The locking protrusion 845 passes through the second surface 813 and is introduced into the locking groove 814 before the stopper 848 is disposed at the front end of the guide unit 816. When the locking protrusion 845 moves along the slope of the second surface 813 and the locking groove 814, the hook 84 rotates counterclockwise with respect to the joint connection portion 847. Consequently, an opening of the hook groove 841 faces forward, and here, the front contact portion 843 rotates to a position lower than the upper end of the housing 81. Consequently, the link 73 can exit the hook groove 841 and move forward.

Since the locking protrusion 845 is completely accommodated in the locking groove 814, the position of the hook 84 remains in the rotated state. Here, the elastic member 83 provides the elastic restoring force to the hook 84 while being maximally tensioned. Here, the elastic restoring force provided by the elastic member 83 will be an extent to which the locking protrusion 845 can remain accommodated in the locking groove 814.

When the user inserts the drawer 71 again, the first rails 721 are inserted into the second rails 722, and the link 73 also moves toward the rear with the first rails 721.

When the link moves a predetermined distance, the link 73 comes in contact with the hook 84 in the state shown in FIG. 19(c) again. As shown in FIG. 19(c), while the locking protrusion 845 is accommodated in the locking groove 814, the link 73 comes in contact with the rear contact portion 844 in a process of moving toward the rear while the rear contact portion 844 protrudes upward past the housing 81.

When the link 73 comes in contact with the rear contact portion 844, the link 73 pushes and moves the hook 84 toward the rear, and the locking protrusion 845 naturally exits the locking groove 814. In this process, the hook 84 is enabled to move toward the rear due to the elastic restoring force provided by the elastic member 83.

When the locking protrusion 845 exits the locking groove 814, the hook 84 rotates clockwise with respect to the joint connection portion 847. In addition, the connecting part 735 is accommodated in the hook groove 841 by the rotation of the hook 84, and the front contact portion 843 is accommodated in the recessed part 734.

Consequently, when the link 73 moves together with the hook 84 when the hook 84 moves toward the rear, the link 73 and the hook 84 move as shown in FIGS. 19(a) and 19(b). Since the hook 84 moves by the elastic restoring force provided by the elastic member 83, the drawer 71 is automatically closed even if it is not pushed continuously from the state shown in FIG. 19(b).

For example, if the drawer 71 is inserted only to an extent to which the link 73 and the hook 84 can be connected to each other at an initial stage in a process of closing the drawer 71, the drawer 71 can be automatically inserted afterwards.

Figure 21A:
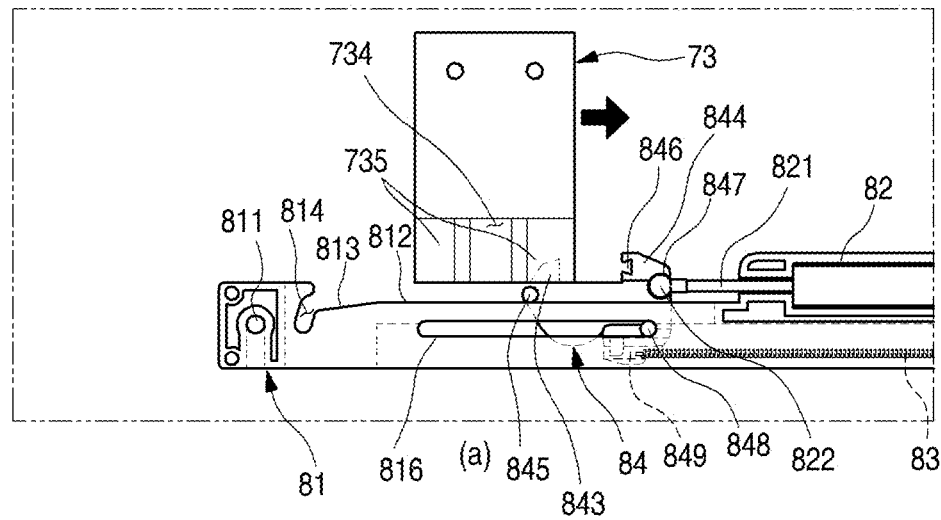
FIGS. 21(a) to 21(c) are views illustrating a re-alignment process of a sliding control assembly.

In some scenarios, the locking protrusion 845 may exit the locking groove 814 due to an impact applied to the cooking appliance 1 or an external vibration generated while the hook 84 is in the state shown in FIG. 19(c). In such scenarios, an abnormal situation as shown in FIG. 21(a) caused by the link moving independently of the hook 84 may occur, thus causing a problem that automatic insertion of the drawer may not be possible. To avoid such abnormal situations, the drawer structure may be configured so as to provide re-alignment of the hook 84 and the link 73.

Figure 21B:
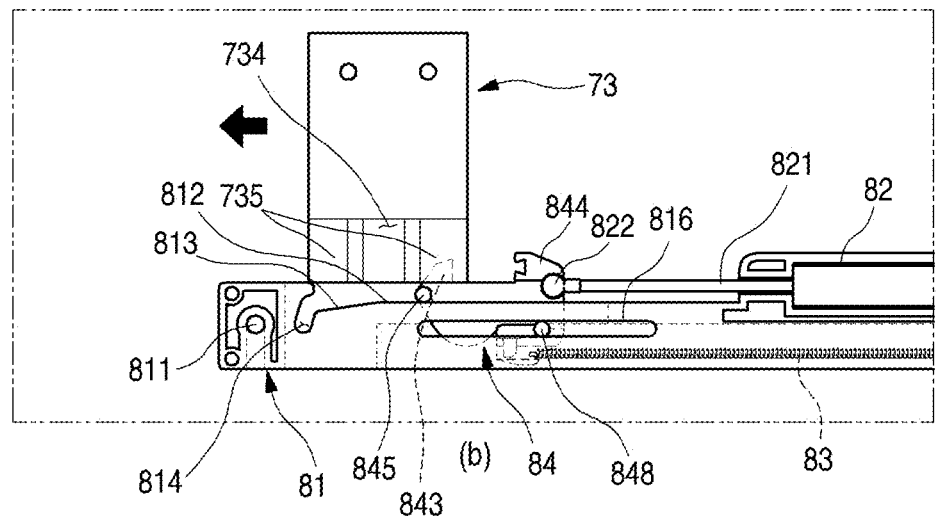
Figure 21C:
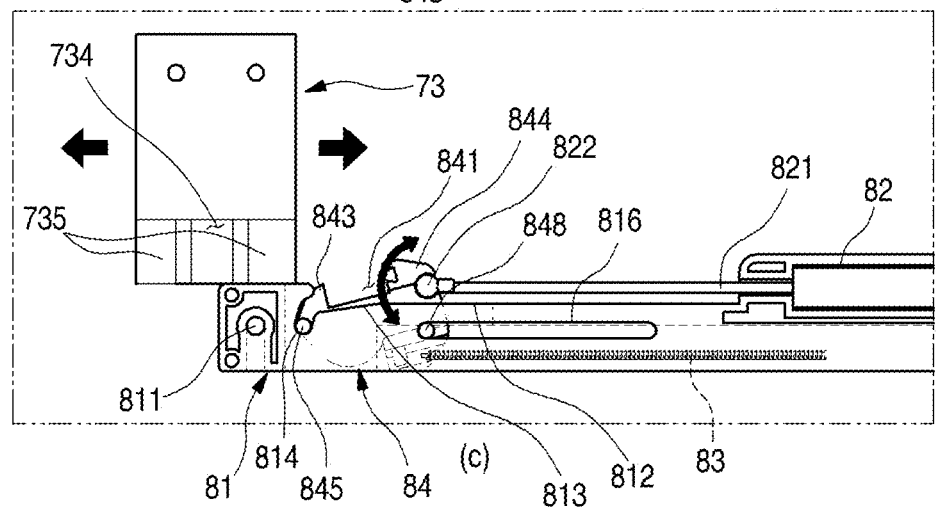
Figure 22:
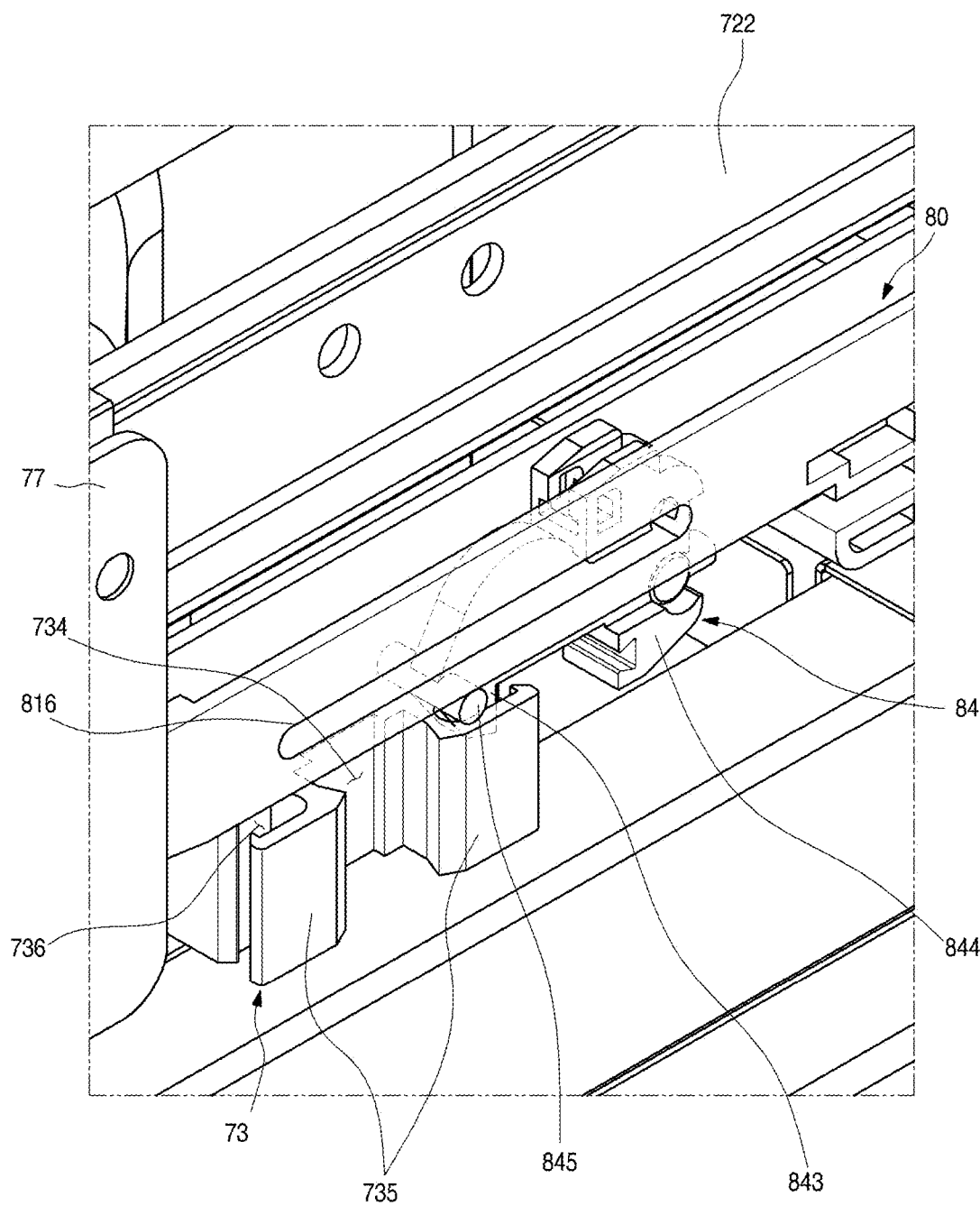
FIG. 22 is a partial perspective view illustrating a re-aligned state of a sliding control assembly.

FIGS. 21(a) to 21(c) are views sequentially illustrating a realignment process when an abnormal situation of the sliding control assembly occurs. FIG. 22 is a partial perspective view illustrating a realigned state of the sliding control assembly.

As shown in FIGS. 21(a) to 21(c) and 22, an abnormal situation may occurs in which the hook 84 moves toward the rear as shown in FIG. 21(a) without coming in contact with the link 73. In such scenarios, a user's manipulation for realignment may be required because the sliding control assembly 80 cannot operate normally in the above state.

A user may be able to recognize that the sliding control assembly 80 is in the abnormal situation as shown in FIG. 21(a) because the drawer 71 may not be able to be closed completely and/or because the automatic closing action or damping action may not occur during a process of operating the drawer 71. In such cases, the drawer structure may be configured so as re-align the hook 84 and the link 73 by the user performing an additional action of withdrawing-and-reinserting the drawer 71. Such withdrawal-and-reinsertion of the drawer 71 may enable the hook 84 to be re-inserted into the proper recessed portion 734 of the link 73.

For example, when a user moves the drawer 71 backward to allow the drawer 71 to be inserted again in the above situation, the rear end of the link 73 and the front contact portion 843 of the hook 84 come in contact with each other, and the front contact portion 843 passes through the tips 737 and is indented in the connecting hole 736 as shown in FIG. 21(b).

When the user withdraws and moves the drawer 71 forward from the above state, the link 73 also moves forward. In addition, since the front contact portion 843 is indented in the connecting hole 736, the hook 84 may move forward together with the link 73.

If the drawer 71 moves more from the above state, the hook 84 becomes the same as the one shown in FIG. 21(c). In other words, since the hook 84 rotates while the locking protrusion 845 is accommodated in the locking groove 814, the front contact portion 843 is disposed inside the recessed part 734 and the connecting part 735 is disposed inside the hook groove 841 in a process in which the drawer 71 is inserted afterwards, such that the link 73 and the hook 84 may move together in a normal state, and the hook 84 may be realigned in a state in which damping and automatic closing are possible as shown in FIG. 22.

The handle is rotatably mounted at the door of the cooking appliance configured as above according to an implementation of the present disclosure, convenience in using the door is improved by the handle, and convenience in using the cooking appliance as a whole is improved.

In addition, an impact can be mitigated and a drawer can be automatically inserted at the same time when the drawer is inserted by selective connection between a link and a sliding control assembly when the drawer is inserted, thereby further improving convenience in use.

Due to numerous possible advantages, the cooking appliance configured as above according to the present disclosure may be applied in various industries related to cooking appliances.

Although implementations have been described with reference to a number of illustrative examples thereof, it should be understood that numerous other modifications and implementations fall within the spirit and scope of the principles of the disclosure. More particularly, various variations and modifications are possible in the component parts and/or arrangements of the subject combination arrangement within the scope of the disclosure, the drawings and the appended claims. In addition to variations and modifications in the component parts and/or arrangements, there may also be alternative uses of the implementations described herein.

What is claimed is:

1. A cooking appliance comprising:
   a drawer defining an accommodation space and configured to be withdrawn or inserted;
   a first rail provided at both sides of the drawer;
   a link component provided at a first side of the first rail and configured to move along with the first rail;
   a frame configured to accommodate the drawer;
   second rails provided at both sides of the frame and configured to slidably accommodate the first rail;

a sliding control assembly provided at the second rails and selectively connected to the link component based on the drawer being withdrawn or inserted,
wherein the sliding control assembly includes:
a housing;
a hook configured to move along the housing and coupled to the link component; and
an elastic member configured to connect the hook and a first side of the housing and to be tensioned based on the hook moving forward to provide elastic force for automatic insertion of the drawer,
wherein the link component includes:
a recessed part recessed to receive a first side of the hook; and
connecting parts protruding at both sides of the recessed part,
wherein, based on the drawer being inserted, the sliding control assembly is connected to the link component such that the drawer is automatically inserted,
wherein, based on the drawer being withdrawn, the drawer is disconnected from the link component such that drawer is smoothly withdrawn.

2. The cooking appliance according to claim 1,
wherein the housing is provided with a damper disposed in parallel to the elastic member, and
wherein the damper includes a rod rotatably coupled to the hook.

3. The cooking appliance according to claim 1,
wherein the hook is provided with a stopper protruding therefrom, and
wherein the sliding control assembly includes a guide unit that is configured to accommodate the stopper and that extends by a length and in a direction corresponding to a movement stroke of the hook.

4. The cooking appliance according to claim 1, wherein a locking protrusion configured to move along a first surface of the housing based on a movement of the hook is provided at a second side of the hook.

5. The cooking appliance according to claim 4, wherein the housing includes:
guide surfaces configured to guide movement of the hook in contact with the locking protrusion based on the housing moving; and
a locking groove that is configured to extend to have a slope at front ends of the guide surfaces and that is configured to accommodate the locking protrusion such that the hook rotates.

6. The cooking appliance according to claim 5,
wherein the guide surfaces include:
a first surface parallel to the second rails, and
a second surface obliquely provided between the first surface and the locking groove,
wherein the slope of the locking groove is greater than a slope of the second surface.

7. The cooking appliance according to claim 5, wherein the hook includes:
a hook groove recessed to accommodate and engage the link component;
a front contact portion defining a first half of the hook at a front end of the hook groove; and
a rear contact portion defining a second half of the hook at a rear end of the hook groove.

8. The cooking appliance according to claim 7, wherein, in a state in which the locking protrusion is accommodated in the locking groove, the hook groove faces forward such that the link component enters or exits the hook groove.

9. The cooking appliance according to claim 7, wherein, in a state in which the locking protrusion is accommodated and rotated in the locking groove, the front contact portion is located inside the housing and the rear contact portion protrudes to the outside of the housing.

10. The cooking appliance according to claim 1, wherein the link component extends in a direction crossing an extension direction of the first rail and extends by a length capable of being engaged with the hook based on the first rail moving forward and backward.

11. The cooking appliance according to claim 1, wherein a connecting hole recessed in a surface facing the hook such that a front end of the hook is inserted is defined at each of the connecting parts.

12. The cooking appliance according to claim 11,
wherein tips protruding inward are formed at an opened inlet side of the connecting hole, and
wherein a distance between the tips is less than a thickness of the front end of the hook such that the front end of the hook is pressed into the connecting hole.

13. The cooking appliance according to claim 12, wherein the tips are facing each other.

14. The cooking appliance according to claim 12, wherein the tips are vertically extending along an opening of the connecting hole and tilted toward an inner portion of the connecting hole.

15. The cooking appliance according to claim 11,
wherein the hook includes:
a hook groove recessed such that the connecting parts are inserted;
a front contact portion protruding from the front end of the hook groove to be in contact with one inner side surface of the recessed part; and
a rear contact portion protruding from the rear end of the hook groove to be in contact with the other inner side surface of the recessed part,
wherein the thickness of the rear contact portion is greater than a thickness of the front contact portion and a width between the connecting holes.

16. The cooking appliance according to claim 1,
wherein the frame includes:
a front frame forming an opening into which the drawer is inserted; and
side frames extending from both sides of the front frame backward,
wherein the second rails are mounted in the front frame and extend in parallel to the side frames.

17. The cooking appliance according to claim 16,
wherein a cover configured to cover the drawer from the top is fixed to and mounted at an upper end of the front frame,
wherein a supporter configured to support the cover is provided at rear half of each of the side frames, and
wherein front ends of the second rails are fixed to the front frame and the rear ends of the second rails are fixed to the supporter.

18. The cooking appliance according to claim 16, wherein the cooking appliance is mounted in an outer case forming appearance of the cooking appliance of the frame.

19. The cooking appliance according to claim 18,
wherein the frame is provided at a lower end of the cooking appliance, and
wherein legs which are in contact with a floor surface where the cooking appliance is mounted are provided at the side frames.

20. The cooking appliance according to claim 1, wherein the first rail has a structure extending in multiple stages.

\* \* \* \* \*